United States Patent [19]

Ohnuki et al.

[11] Patent Number: 5,060,002

[45] Date of Patent: Oct. 22, 1991

[54] AUTOMATIC FOCUS ADJUSTING DEVICE

[75] Inventors: Ichiro Ohnuki, Kawasaki; Masaki Higashihara, Yokohama; Akira Akashi, Yokohama; Terutake Kadohara, Yokohama, all of Japan

[73] Assignee: Canon Kabushiki Kaisha, Tokyo, Japan

[21] Appl. No.: 308,034

[22] Filed: Feb. 9, 1989

[30] Foreign Application Priority Data

Feb. 11, 1988 [JP] Japan .................................. 63-029776
May 16, 1988 [JP] Japan .................................. 63-118820

[51] Int. Cl.[5] ...................... G03B 13/36; G03B 17/38; G02B 7/28
[52] U.S. Cl. .................................... 354/402; 354/266; 250/201.2
[58] Field of Search ............... 354/402, 266, 406, 407, 354/408; 250/201 PF, 204, 201.2, 201.8

[56] References Cited

U.S. PATENT DOCUMENTS 4,783,677 11/1988 Hamada et al. ..................... 354/402
4,908,645 3/1990 Higashihara et al. ............... 354/402

FOREIGN PATENT DOCUMENTS 61-160824 7/1986 Japan .
62-263728 11/1987 Japan .

Primary Examiner—W. B. Perkey
Attorney, Agent, or Firm—Fitzpatrick, Cella, Harper & Scinto

[57] ABSTRACT

A focus adjusting device which finds the lens driving amount for the position of the image plane in the future based on focus adjustment data obtained in past focus adjustment cycles includes a calculation circuit for calculating the lens driving amount or the position of the image plane in accordance with predetermined functional equations which use the data obtained in the past. The functional equation or equations used may be changed depending upon the number of times in the past over which the focus adjusting cycle was executed, or the reliability, e.g., contrast, of the auto focus signal.

41 Claims, 15 Drawing Sheets

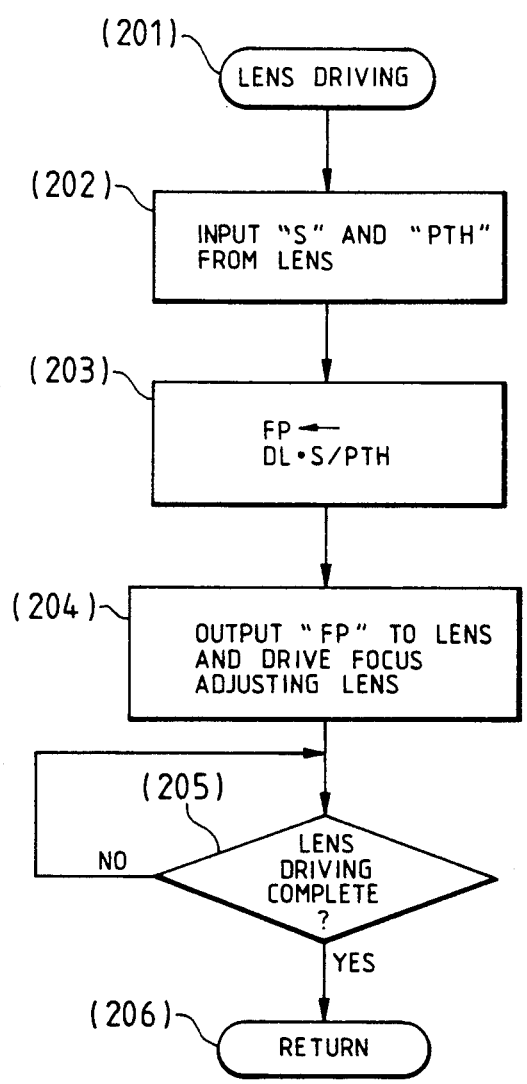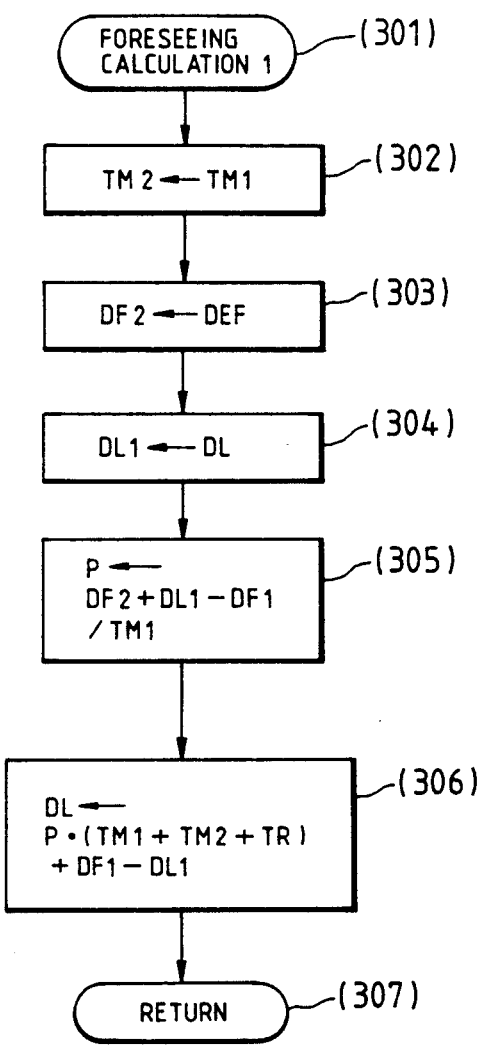

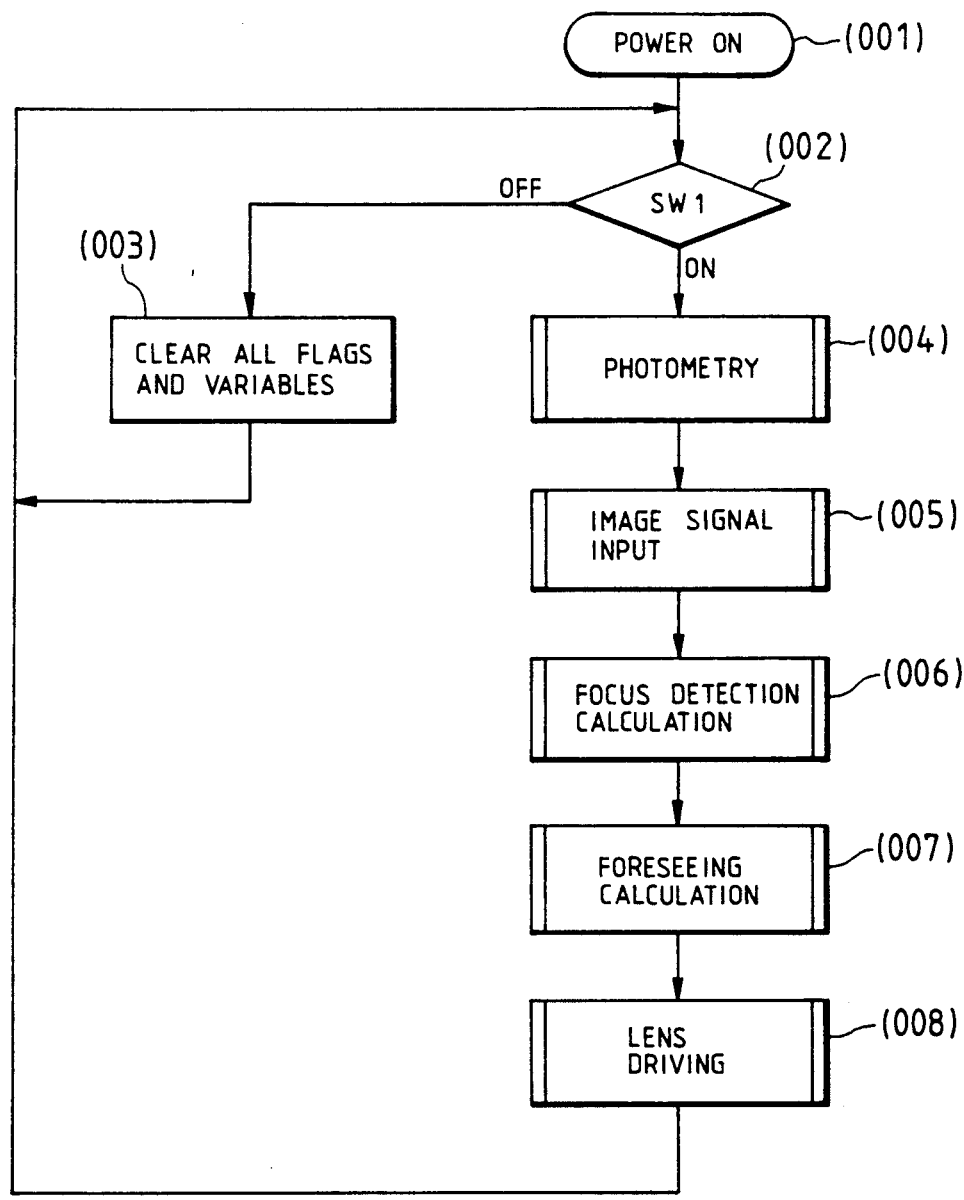

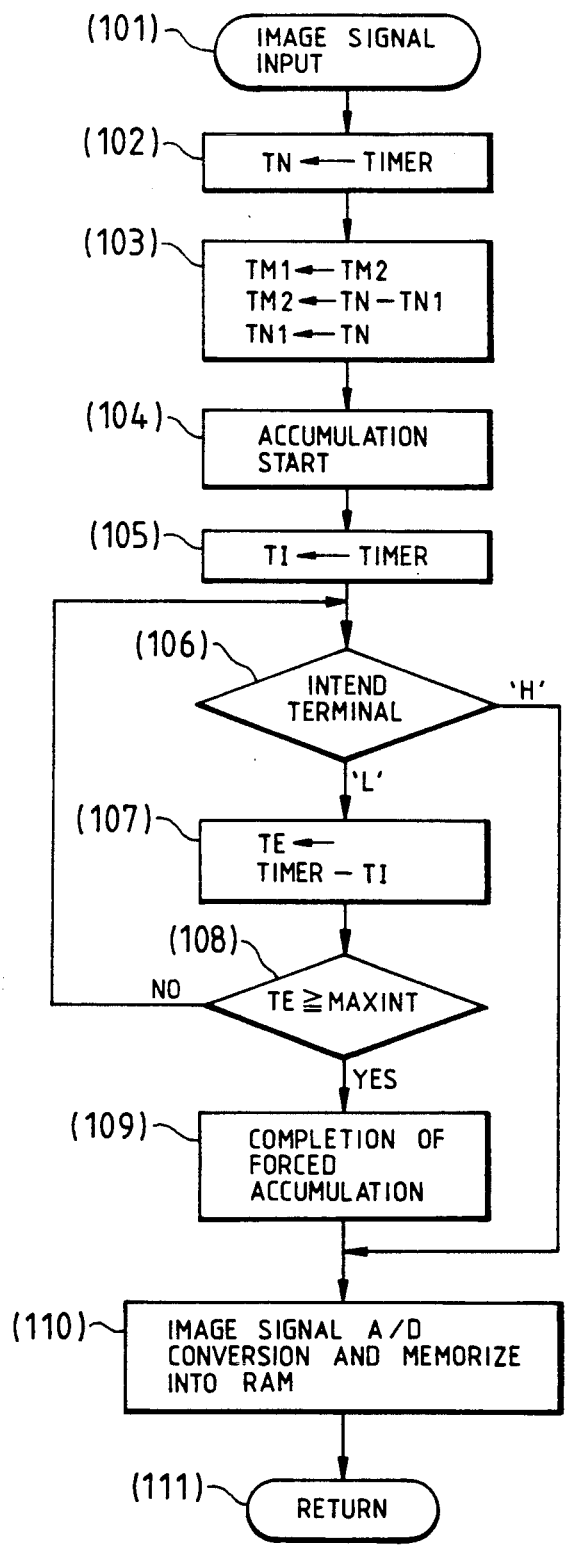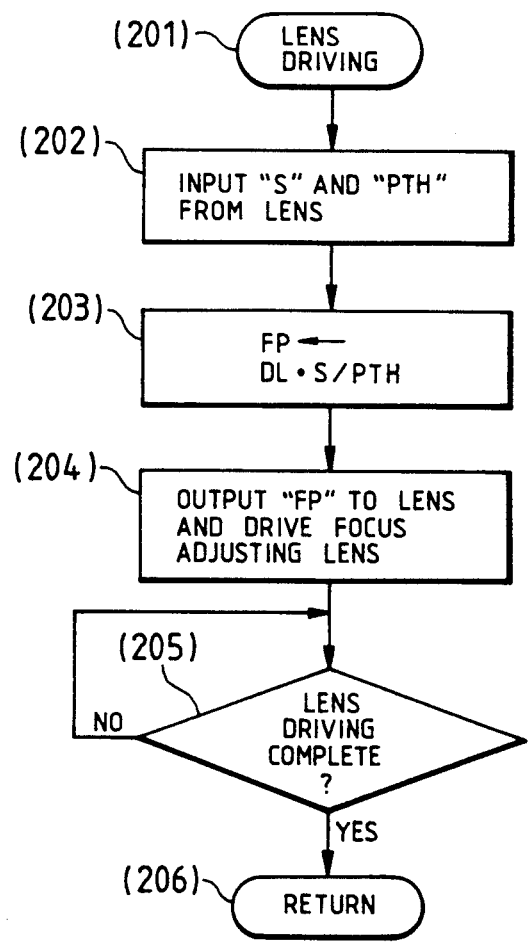

AUTOMATIC FOCUS ADJUSTING DEVICE

BACKGROUND OF THE INVENTION

1. Field of the Invention

This invention relates to an automatic focus adjusting device for use in a camera or the like.

2. Related Background Art

A method of correcting the out-of-focus condition of the object lens attributable to the movement of an object when pursuing the moving object using AF has already been proposed by the assignee of Japanese Patent Application No. 62-263728.

In the embodiment of the above-mentioned patent application, the movement of the image plane of the object is approximated to a quadratic function or a linear function, while the time required for distance measurement calculation, lens driving or release is foreseen under a certain assumption and the position of the image plane of the object at a certain time in the future (for example, the time when the control of lens driving is completed or the time when the shutter curtains are moved after the release operation) is foreseen, and in accordance with the result thereof, lens driving is effected and the delay in the pursuit for the moving object is eliminated.

FIG. 2 of the accompanying drawings is a graph for illustrating the above-described method of correcting lens driving. In the figure, the horizontal axis represents time t, and the vertical axis represents the position d of the image plane of the object.

A curve f(t) indicated by a solid line represents the position of the image plane of the object at a time t when the object approaches the camera in the direction of the optic axis when the photo-taking lens is at infinity. A curve l(t) indicated by a broken line represents the position of the image plane of the object at the position of the photo-taking lens at the time t, and a section $[t_i, t_i']$ is the time of the focus detecting operation, and a section $[t_i', t_{i+1}]$ is the time of the lens driving operation. Accordingly, the difference in the direction of the vertical axis d between f(t) and l(t) at the same time t corresponds to the so-called defocus amount.

DFi represents the defocus amount detected at a time $t_i$, DLi represents the lens driving amount as converted into the image plane moving amount executed from the result of the focus detection at a time $t_{i-1}$, and $TM_i$ represents the time interval between the focus detecting operations.

In the example shown in FIG. 2, the assumption that the position of the image plane of the object changes in accordance with a quadratic function is placed as a premise for correction. That is, it is assumed that if the current and past three positions $(t_1, f_1)$, $(t_2, f_2)$ and $(t_3, f_3)$ of the image plane are known at a time $t_3$, the position $f_4$ of the image plane at a time $t_4$ can be foreseen.

However, what the camera can actually detect are not the positions $f_1$, $f_2$ and $f_3$ of the image plane, but the defocus amounts DF1, DF2 and DF3 and the lens driving amounts DL1 and DL2 as converted into the image plane moving amounts. The time $t_4$ is a future value, and actually is a value which varies as the accumulating time of an accumulation type sensor is varied by the brightness of the object, but here, for simplicity, it is assumed to be a known value in the relation that $t_4 - t_3 = t_3 - t_2$.

Under the above-described assumption, the lens driving amount DL3 when lens driving is effected toward $t_4$ at a time $t_3$, from the result of the focus detection at the time $t_3$ is found from the following equations:

$$at^2 + bt + c = f(t) \tag{1}$$

$$at_1^2 + bt_1 + c = f_1 \tag{2}$$

$$at_2^2 + bt_2 + c = f_2 \tag{2'}$$

$$at_3^2 + bt_3 + c = f_3 \tag{2''}$$

If in FIG. 2, the point $l_1$ is considered to be the origin, $$f_1 = DF1, f_2 = DF2 + DF1, f_3 = DF3 + DL2 + DL1 \tag{3}$$

$$t_1 = 0, t_2 = TM1, t_3 = TM1 + TM2 \tag{4}$$

If the equations (3) and (4) are substituted into the equations (2), (2)' and (2)'', a, b and c are found as follows:

$$a = \frac{DF3 + DL2 - DF2}{(TM1 + TM2) \cdot TM2} + \frac{DF1 - DL1 - DF2}{(TM1 + TM2) \cdot TM1} \tag{5}$$

$$b = \frac{DF2 + DL1 - DF1 - a \cdot TM1^2}{TM1} \tag{6}$$

$$c = DF1 \tag{7}$$

Consequently, the lens driving amount DL3 as converted into the image plane moving amount at the time $t_4$ is $$\begin{aligned} DL3 &= f_4 - l_3 \\ &= f_4 - (f_3 - DF3) \\ &= a \cdot (TM1 + TM2 + TM3)^2 + b(TM1 + TM2 \\ &\quad + TM3) + c - \{a(TM1 + TM2)^2 + \\ &\quad b(TM1 + TM2 + c)\} + DF3 \\ &= a\{(TM1 + TM2 + TM3)^2 - (TM1 + TM2)^2\} + \\ &\quad b \cdot TM3 + DF3. \end{aligned} \tag{8}$$

Here, assuming that TM3 is known in the relation that TM3 = TM2 as previously described, DL3 is found from the equation (8).

In the same manner, the lens driving amounts at the time $t_4$ and subsequent time $t_n$ can be found from the past three detected defocus amounts $DF_{n-2}$, $DF_{n-1}$ and $DF_n$, the past two actual lens driving amounts $DL_{n-2}$ and $DL_{n-1}$ and the past two time intervals $TM_{n-2}$ and $TM_{n-1}$.

$$a_n = \frac{DF_n + DL_{n-1} - DF_{n-1}}{(TM_{n-2} + TM_{n-1})TM_{n-1}} + \frac{DF_{n-2} - DL_{n-2} - DF_{n-1}}{(TM_{n-2} + TM_{n-1})TM_{n-2}} \tag{8}$$

$$b_n = \frac{DF_{n-1} + DL_{n-2} - DF_{n-2} - a \cdot TM_{n-2}^2}{TM_{n-2}} \tag{9}$$

$$DL_n = a_n \cdot \{(TM_{n-2} + TM_{n-1} + TM_n)^2 - (TM_{n-2} + TM_{n-1})^2\} + b_n \cdot TM_n + DF_n \tag{10}$$

If in accordance with the equations (8), (9) and (10), the defocus amount $DL_n$ for effecting lens driving is found from the detected defocus amount $DF_n$ and lens driving is effected, proper focusing even to a moving object will always become possible at the end of lens driving.

The operation when the release operation has taken place during such automatic focus adjustment control will now be described with reference to FIGS. 3 and 4 of the accompanying drawings.

FIG. 3 shows a case where the release operation has taken place at a time $t_{x1}$ under the situation that focus detection is started at a time $t_n$ and lens driving $DL_n$ is effected at a time $t_n$, and lens driving is completed at a time $t_{n+1}$. Here, the time from after the release operation has taken place until film exposure is actually effected, i.e., the so-called release time lag, is TR. Thus, in the figure, film exposure is effected at a time $t_{x1}+TR$. In the case where lens driving is stopped simultaneously with the taking-place of the release operation, the position $l_{x1}$ of the image plane of the lens at the time $t_{x1}$ is the position $l_{r1}$ of the image plane of the lens at the time $t_{x1}+TR$, and at this time, the image plane of the object is positioned at $f_{r1}$ and therefore, the object image exposed on the film suffers from defocus of $f_{r1}-l_{r1}=d_{x1}$, that is, an out-of-focus condition occurs.

In the case where lens driving is continued even if the release operation takes place, $l_{n+1}'$ is reached at a time $t_{n+1}$, and the position of the image plane of the lens at the time $t_{x1}+TR$ is $l'_{r1}$, and an out-of-focus condition of $f_{r1}-l'_{r1}=d'_{x1}$, though small in amount, still occurs.

FIG. 4 shows a case where the release operation has taken place during lens driving. In the case where as in the case of FIG. 3, lens driving is stopped simultaneously with the release operation, an out-of-focus condition of $f_{r2}-l_{r2}=d_{x2}$ occurs, and in the case where lens driving is continued, an out-of-focus condition of $f_{r2}-l'_{r2}=d'_{x2}$ occurs.

A description will now be given of a correcting method which takes a uniform release time lag into consideration. In this case, the time $t_{n+1}$ may be considered to extend by an amount corresponding to the release time lag TR and therefore, the equation (10) is modified as follows:

$$DL_n = a_n \cdot \{(TM_{n-2}+TM_{n-1}+TM_n+TR)^2 - (TM_{n-2}+TM_{n-1})^2\} + b_n \cdot (TM_n+TR) + DF_n \tag{11}$$

FIG. 5 of the accompanying drawings shows the control of the above equation (11). A curve f'(t) indicated by a dot-and-dash line is the position of the image plane of the object which takes the uniform release time lag TR into consideration, and the lens may be controlled so as to be along this curve. Accordingly, the object in the view-finder is always out of focus by an amount corresponding to the release time lag. Assuming that, as in FIG. 3, the release operation has taken place at the time $t_{x1}$, where lens driving is stopped, the position of the image plane of the lens is $l_{r1}$ at the time $t_{x1}+TR$, and the actual position of the image plane of the object is $f_{r1}$ and therefore, an out-of-focus condition of $f_{r1}-l_{r1}=d_{x1}$ occurs. Where lens driving is continued, an out-of-focus condition of $f_{r1}-l'_{r1}=d'_{x2}$ occurs. FIG. 6 of the accompanying drawings shows a case where the release operation has taken place during lens driving, and where lens driving is stopped simultaneously with the release operation, an out-of-focus condition of $f_{r2}-l_{r2}=d_{x2}$ occurs, and where lens driving is continued, an out-of-focus condition of $f_{r2}-l'_{r2}=d'_{x2}$ occurs.

As described above, again in the aforedescribed method which takes the release time lag into consideration, considerably good correction is possible although more or less an out-of-focus condition remains depending on the timing of release.

FIG. 7 of the accompanying drawings newly depicts the manner of the first and subsequent focus detecting operations in a case where the correcting system of FIG. 5 or 6 is applied. From the defocus amounts DF1, DF2 and DF3 and the lens driving amounts DL1 and DL2 obtained at the times $t_1$, $t_2$ and $t_3$, $a_3$ and $b_3$ are determined by the use of the equations (8) and (9), and if lens driving is effected after DL3 is calculated from the equation (11), the lens reaches $l_4$ at a time $t_4$. When a release signal comes at this point of time, release takes place after TR and at this time, the image plane of the object is at $f_{r4}$ and therefore coincides with the lens position $l_4$, and a photograph which is in focus can be taken. If the release signal does not come, the aforedescribed focus detecting operation cycle is repeated, and the release positions after the fourth and fifth focus detecting operations and $l_5$ and $l_6$, respectively.

Now, in the above-described example, the position of the object is approximated by a quadratic function and therefore, the lens positions after $l_4$ are accurately driven to desired positions (the dot-and-dash line in the figure), but it is after the third lens driving termination time $t_4$ that this correction effect appears. Accordingly, even if the release signal comes before that, the correction will not be effective and a photograph which is out of focus will be taken, or to ensure an in-focus condition, release must be waited for until $t_4$. So, to apply a correction a little earlier, the position of the object may be approximated by a linear function. This is shown in FIG. 8 of the accompanying drawings.

If the image planes of the object at the times $t_1$ and $t_2$ are $f_1$ and $f_2$, the linear functional equation passing through these two points is $$pt+q=g(t) \tag{12}$$

Representing p and q with $l_1$ as the origin and by the use of DF1, DL1 and TM1, $$p = \frac{DF2 + DL1 - DF1}{TM1} \tag{13}$$

$$q = DF1. \tag{14}$$

Consequently, the foreseen position of the image plane of the object which takes the release time lag into consideration is $l_{r3}$, and the required lens driving amount DL is $$DL = p(TM1+TM2+TR)+DF1-DL1. \tag{15}$$

If the above-described operation is repeated, the positions in which lens driving is completed are $l_3$, $l_4$, $l_5$, . . ., but these have errors relative to the desired position f'(t) (dot-and-dash line) which takes the release time lag into consideration. If the position of the object is thus approximated by a linear function, a considerable correction error occurs in a case where the position of the image plane of the object is not linear relative to time. That is, it will be seen that if the function applied when the position of the object is supposed is fixed to one kind, the time until correction begins to be effective (the correction time lag) and the correction accuracy are contrary to each other.

Also, according to the foreseeing method using the quadratic function represented by the equations (8), (9) and (10) described above with respect to FIG. 2, if the position of the image plane of the object changes in accordance with the quadratic function and the defocus amount detected at each time is accurate, proper correction is accomplished as described above, but if proper detection of the defocus amount fails to be accomplished due to a cause such as the low contrast of the object, the error will be enlarged and excessive correction will be made because the correction equation is the extrapolation of the quadratic function.

That is, when as shown in FIG. 16 of the accompanying drawings, relative to the actual positions $f_1$, $f_2$ and $f_3$ of the image plane, the positions $f_1'$, $f_2'$ and $f_3'$ of the image plane are detected as the defocus amounts resulting from the focus detection (that is, when an error occurs to the defocus amount), the position of the image plane at the time $t_4$ foreseen by the quadratic function on the basis of $f_1'$, $f_2'$ and $f_3'$ is $l_4$, and if the lens is driven to this position, the out-of-focus situation represented by er in the figure occurs at the time $t_4$.

SUMMARY OF THE INVENTION

One aspect of the application is to provide a focus adjusting device which makes the foreseeing function variable in conformity with the number of the focus detecting operation data obtained in the past, thereby carrying out the lens driving method by foreseeing quickly and highly accurately.

One aspect of the application is to provide, under the above object, a focus adjusting device which performs the foreseeing operation by the use of a low-order functional equation when the number of the focus detection data in the past is small and which changes over from said low-order functional equation to a high-order functional equation and performs the foreseeing operation when the number of said data increases.

One aspect of the application is to select a plurality of foreseeing functions prepared in conformity with the conditions of an object and always accomplish proper focus adjustment.

One aspect of the application is to determine, under the above object, the foreseeing function in conformity with the reliability of the result of focus detection and always accomplished proper focus adjustment.

One aspect: of the application is to provide, under the above object, high-order and low-order foreseeing functions and to said high-order and low-order function in conformity with the reliability of the result of focus detection and to execute the foreseeing operation by said selected function.

One aspect of the application is to find, under the above object, the foreseen values by high-order and low-order functions, find the lens driving amount conforming to both of a plurality of foreseen values by said different functions and always accomplish accurate focus adjustment.

Other objects of the present invention will become apparent from the following detailed description of some embodiments thereof taken in conjunction with the accompanying drawings.

BRIEF DESCRIPTION OF THE DRAWINGS

FIG. 12 is a program flow chart showing the lens driving sub-routine in FIG. 10.

FIG. 13 is a program flow chart showing the foreseeing calculation 1 sub-routine in FIG. 10.

FIG. 18 is a program flow chart showing the general program flow of a camera which realizes the operation shown in FIG. 17.

FIG. 19A and B are program flow charts showing the image signal input sub-routine and the lens driving sub-routine in the flow of FIG. 18.

DESCRIPTION OF THE PREFERRED EMBODIMENTS

Figure 1:
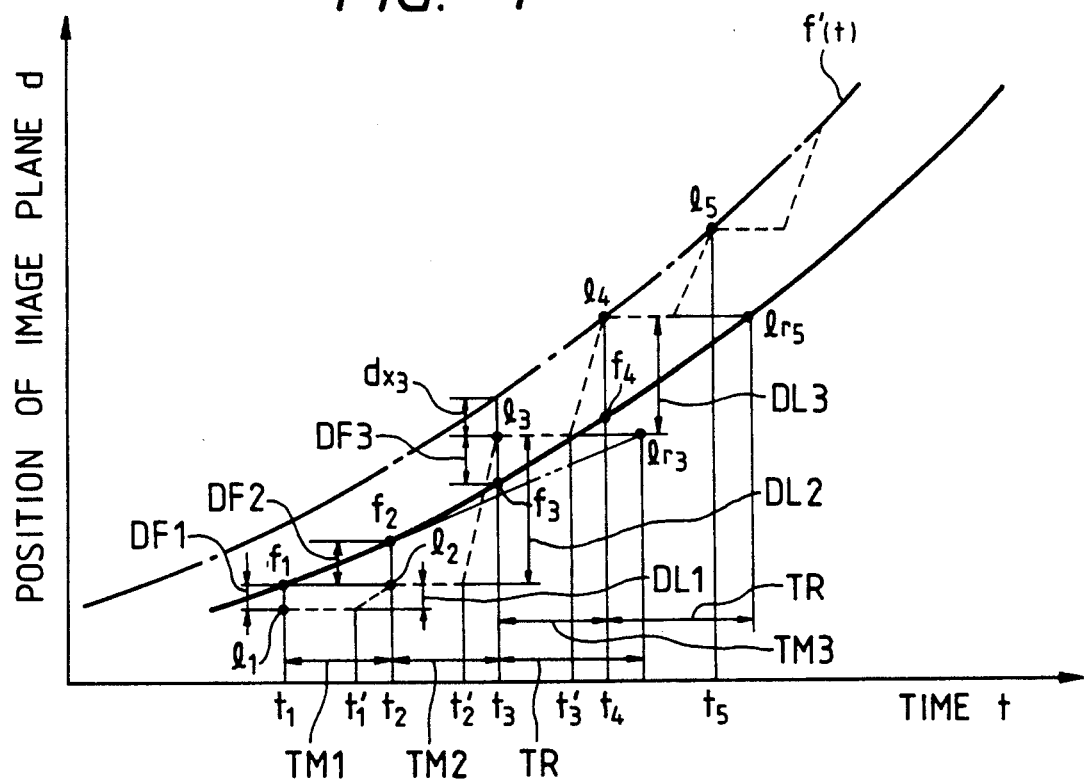
FIG. 1 illustrates the principle of the operation of a focus adjusting device according to the present invention.

FIG. 1 shows the lens driving correcting method of the present invention.

First, by the closing of an AF starting switch (SW1 to be described), the focus detecting operation is performed at $t_1$, whereby the defocus amount DF1 is obtained and lens driving is effected by DL1 (at this time, DL1=DF1), and the lens arrives at $l_2$.

The second focus detecting operation is performed at $t_2$, whereby DF2 is obtained and from data DF1, DF2, DL1 and TM1 (TM2=TM1), a primary approximation is effected by the equation (15) to calculate the lens driving amount DL2, and driving is effected, whereby the lens arrives at $l_3$. This lens position $l_3$ is an insufficient correction because in the equation (15); it is a correction in primary approximation, and has an error of $dx_3$ relative to the ideal position, but the error can be greatly improved. Thereafter, the third focus detecting operation is performed at $t_3$ and, when the defocus amount DF3 is obtained in the third focus detection, DL3 is now found by the approximation equation (11) of the quadratic function, and the lens is driven to $l_4$. By doing so, a rough correction is exerted in the second lens driving, and a correction more accurate than in the third lens driving is exerted and therefore, the correction time lag can be shortened and correction of good accuracy becomes possible.

Figure 7:
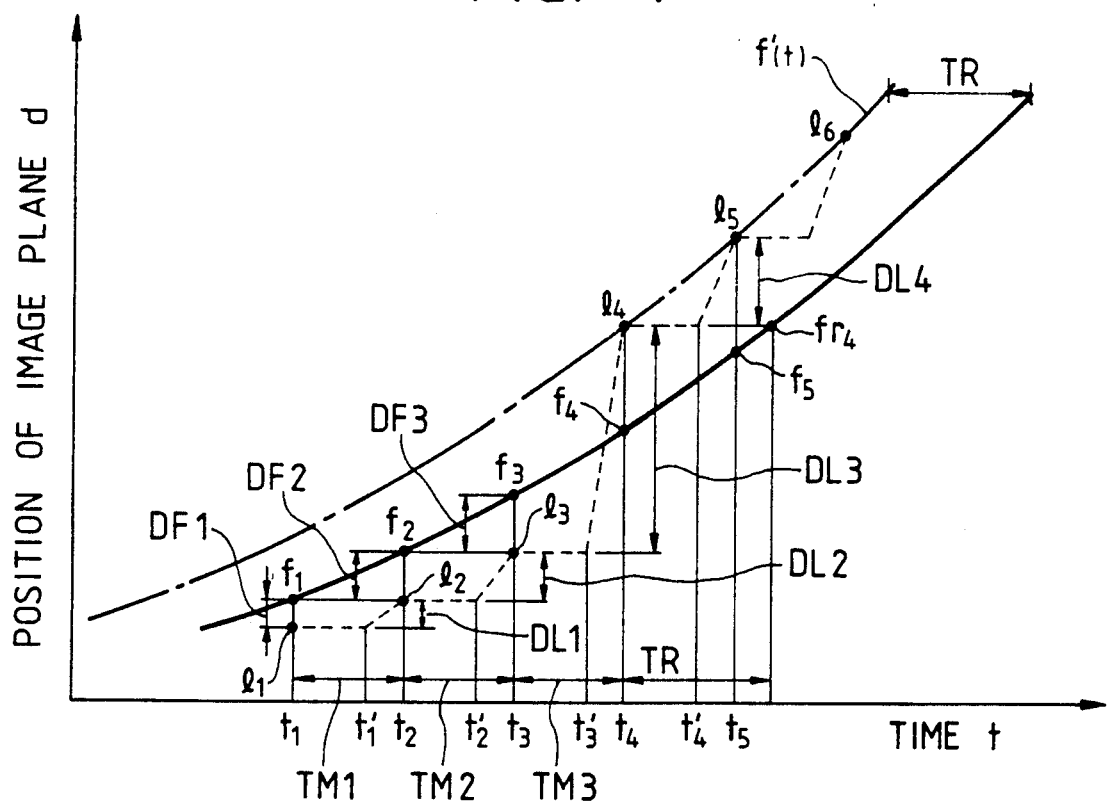
Figure 8:
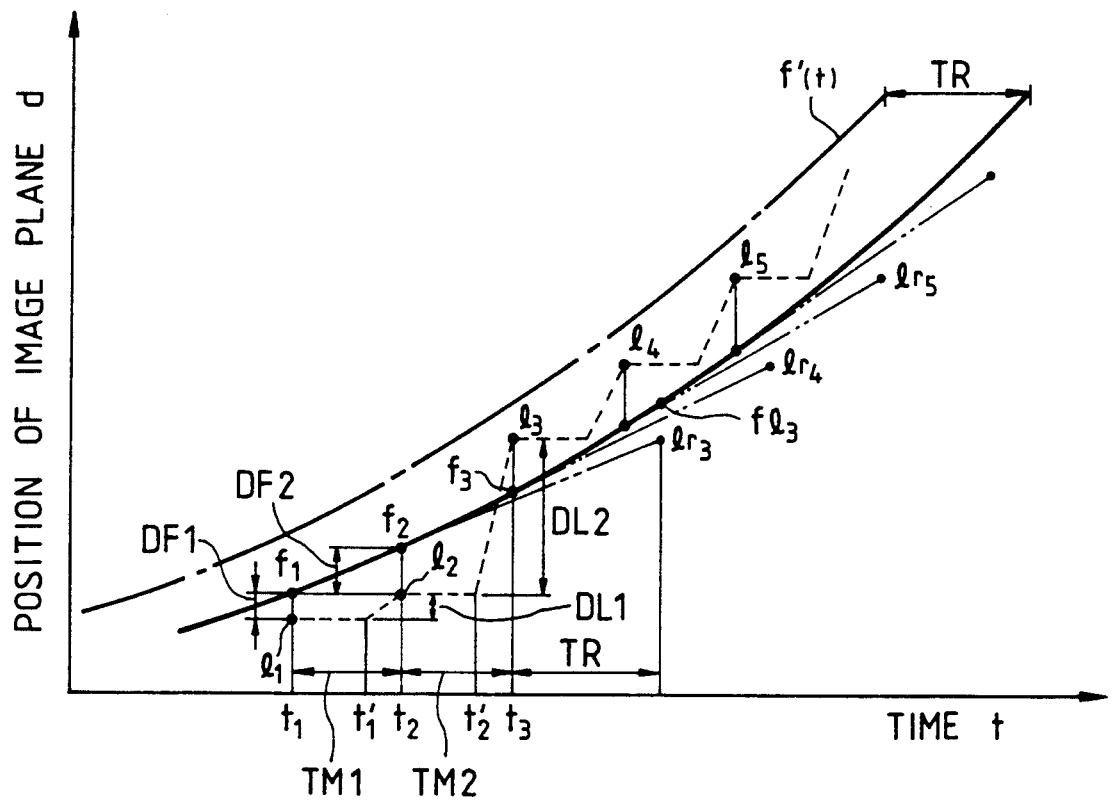
FIG. 8 illustrates the focus adjusting operation when the foreseeing operation using a linear function is adopted.

Further, there is the following advantage in this system. In FIG. 7, the position $f_{r4}$ of the image plane is foreseen on the assumption that TM3=TM2, but TM3 and TM2 each comprise the image data accumulation time, the calculation time and the lens driving time, and the accumulation time and the calculation time can be recognized in advance, but the driving time cannot be known unless the lens is actually driven and thus, TM3 always has an estimated error. Since in the example of FIG. 7, DL3<<DL2, TM3 actually ought to be greater than TM2, and the actual $l_4$ deviates to the right from the position of FIG. 7. Also, in the next cycle, DL4<DL3 and therefore, the position $l_5$ deviates relative to the ideal position and after all, it is from about $l_6$ that the lens converges to f'(t). On the other hand, in FIG. 1 which shows the present invention, DL1≠DL2, but DL2≈DL3 and therefore, considerably good convergence is experienced at $l_4$. As described above, the present invention is also greatly improved in respect of the converging property.

Figure 9:
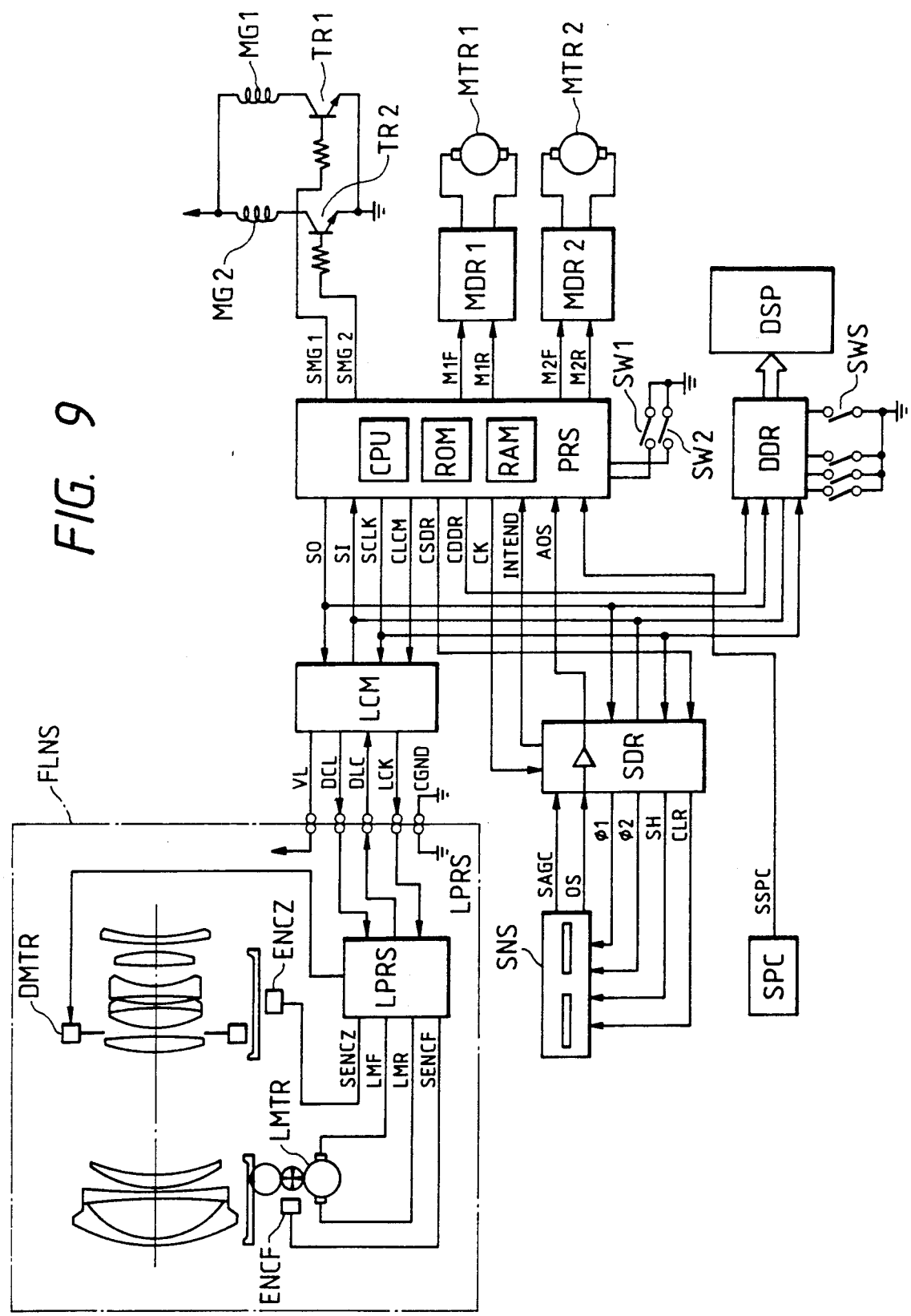
FIG. 9 is a circuit diagram showing an embodiment of a camera which performs the focus adjusting operation shown in FIG. 1.

FIG. 9 is a circuit diagram showing an embodiment of a camera provided with the automatic focus adjusting device according to the present invention which effects the lens driving of FIG. 1.

In FIG. 9, a computer PRS is a control device for the camera, and is, for example, a one-chip microcomputer having a CPU (central processing unit), a ROM, a RAM and an A/D converting function therein. The computer PRS performs a series of operations of the camera such as the automatic exposure controlling function, the automatic focus detecting function and the winding-up of film in accordance with the sequence program of the camera stored in the ROM. For that purpose, the computer PRS communicates with the surrounding circuits and the lens in the camera body by the use of signals SO, SI and SCLK for synchronous communication and communication selection signals CLCM, CSDR and CDDR, and controls the operations of each circuit and the lens.

SO is a data signal output from the computer PRS, SI is a data signal input to the computer PRS, and SCLK is a synchronizing clock for the signals SO and SI.

LCM designates a lens communication buffer circuit which supplies electric power to the power source terminal for the lens when the camera is being operated, and which provides a communication buffer between the camera and the lens when the selection signal CLCM from the computer PRS is at a high potential level (hereinafter referred to as 'H').

When the computer PRS renders CLCM into 'H' and delivers predetermined data from SO in synchronism with SCLK, LCM outputs the buffer signals LCK and DCL of SCLM and SO, respectively, through the contact between the camera and the lens. Simultaneously therewith, the computer PRS outputs the buffer signal of the signal DLC from the lens to SI, and inputs the data of the lens from SI in synchronism with SCLK.

SDR denotes a drive circuit for a line sensor device SNS for focus detection comprised of a CCD or the like. The drive circuit SDR is selected when the signal CSDR is at 'H', and is controlled from the computer PRS by the use of SO, SI and SCLK.

Signal CK is a clock for producing clocks $\phi 1$ and $\phi 2$ for driving the CCD, and signal INTEND is a signal which informs the computer PRS that the accumulating operation has been completed.

The output signal OS of the sensor device SNS is a time-serial image signal synchronized with the clocks $\phi 1$ and $\phi 2$, and is amplified by an amplifier circuit in the drive circuit SDR, whereafter it is output as AOS to the computer PRS. The computer PRS receives as an input AOS from an analog input terminal, and A/D-converts it by the A/D converting function therein in synchronism with CK, and thereafter stores it into the predetermined address of the RAM.

SAGC which also is the output signal of the sensor device SNS is the output of a sensor for AGC (auto gain control) in the sensor device SNS, and is input to the drive circuit SDR and used for the accumulation control of the sensor device SNS.

SPC designates a photometric sensor for exposure control which receives the light from an object passed through the photo-taking lens, and the output SSPC thereof is input to the analog input terminal of the computer PRS and is A/D-converted, whereafter it is used for automatic exposure control (AE) in accordance with a predetermined program.

DDR denotes a circuit for switch detection and display. The circuit DDR is selected when the signal CDDR is at 'H', and is controlled from the computer PRS by the use of SO, SI and SCLK. That is, it changes over the display of the display member DSP of the camera on the basis of data sent from the computer PRS and informs the computer PRS of the ON or OFF state of the various operating members of the camera by communication.

Switches SW1 and SW2 are switches operatively associated with a release button, not shown, and the switch SW1 is closed by the first-stage depression of the release button and the switch SW2 is closed by the depression of the release button to the second stage. The computer PRS, as will be described later, performs photometry and the automatic focus adjusting operation upon closing of the switch SW1, and performs exposure control and winding-up of film with the closing of the switch SW2 as a trigger. The switch SW2 is connected to the "interruption input terminal" of the microcomputer PRS, and even when the program is being executed during the closing of the switch SW1, interruption is exerted by the closing of the switch SW2 and a shift can be immediately be made to a predetermined interruption program.

MTR1 designates a motor for feeding the film, and MTR2 denotes a motor for driving the mirror up and down and charging the shutter spring, and forward and reverse rotations of these motors are controlled by their respective drive circuits MDR1 and MDR2. Signals M1F, M1R, M2F and M2R input from the computer PRS to the drive circuits MDR1 and MDR2 are motor controlling signals.

MG1 and MG2 designate magnets for starting the movement of the forward and rearward shutter curtains. These magnets are electrically energized by signals SMG1 and SMG2 and amplifying transistors TR1 and TR2, and shutter control is effected by the computer PRS.

The circuit DDR for switch detection and display, the motor drive circuits MDR1 and MDR2 and shutter control have no direct relation with the present invention and therefore need not be described in detail.

Signal DCL input to the control circuit LPRS in the lens in synchronism with LCK is command data from the camera to the lens FLNS, and the operation of the lens to the command is predetermined.

The control circuit LPRS analyzes the command in accordance with a predetermined procedure, and effects the focus adjusting operation, the aperture controlling operation and the outputting of the various operation situations of the lens (how much the focus adjusting optical system has been moved, by how many steps the aperture has been stopped down, etc.) and various parameters (such as the full open F-number, the focal length, the coefficient of the defocus amount vs. the amount of axial movement, etc.) from an output DLC.

An example of the zoom lens is shown in the embodiment, and when a command for focus adjustment is sent from the camera, a motor LMTR for focus adjustment is driven by signals LMF and LMR in accordance with the amount and direction of driving sent at the same time, thereby moving the optical system in the direction of the optic axis and accomplishing focus adjustment. The amount of movement of the optical system is monitored by the pulse signal SENCF of an encoder circuit ENCF and is counted by a counter in the control circuit LPRS, and at a point of time whereat predetermined movement has been completed, LPRS itself renders the signals LMF and LMR into L' and brakes the motor LMTR.

Therefore, once the command for focus adjustment has been sent from the camera, the computer PRS of the control device in the camera need not be concerned at all in the lens driving until the lens driving is completed. Design is also made such that the content of said counter can be delivered to the camera as required.

When a command for aperture control has been sent from the camera, a conventional stepping motor DMTR for aperture driving is driven in accordance with the number of aperture steps sent at the same time.

ENCZ designates an encoder circuit attendant on a zoom optical system, and the control circuit LPRS receives as an input a signal SENCZ from the encoder circuit ENCZ and detects the zoom position. The lens parameters at each zoom position are stored in the control circuit LPRS, and a parameter corresponding to the current zoom position is sent to the camera when required from the computer PRS of the camera side.

The operation of the camera constructed as described above will now be described with reference to the flow charts of FIG. 10 and so on.

When a power source switch, not shown, is closed, the supply of electric power to the microcomputer PRS is started and the computer PRS starts to execute the sequence program stored in the ROM.

Figure 10:
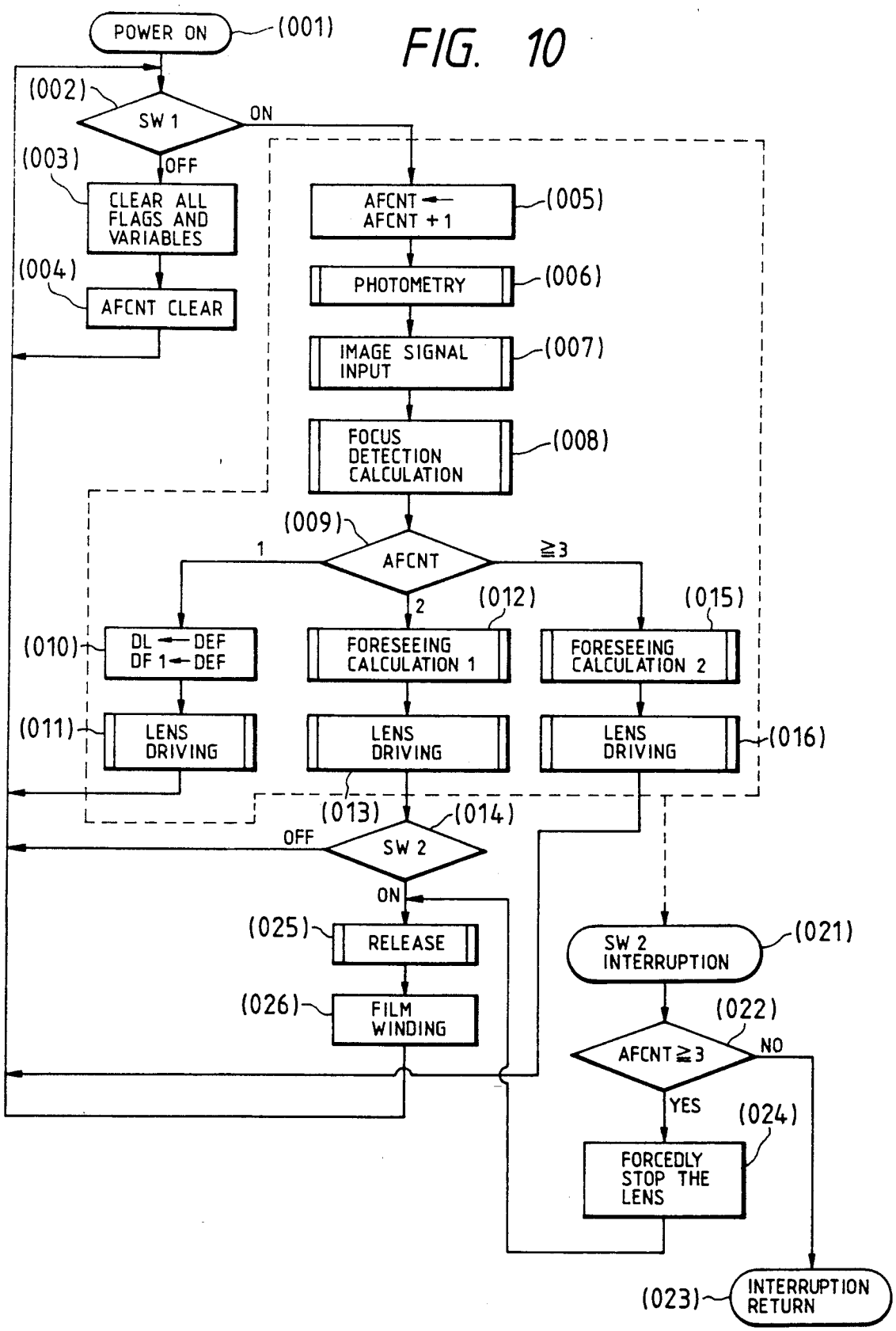
FIG. 10 is a flow chart showing a program flow for illustrating the operation in the camera shown in FIG. 9.

FIG. 10 is a flow chart showing the flow of the whole of said program. When the execution of the program is started by said operation, the state of the switch SW1 adapted to be closed by the first-stage depression of the release button is detected at step (002) via step (001), and when the switch SW1 is OFF, a shift is made to step (003), where all of flags for control and variables set in the RAM in the computer PRS are cleared and initialized, and at step (004), a counter AFCNT for counting the number of times of distance measurement is cleared. Said steps (002)–(004) are repetitively executed until the switch SW1 becomes ON or the power source switch becomes OFF.

By the switch SW1 becoming ON, a shift is made from step (002) to (005).

At step (005), a new distance measurement is started and therefore, the value of the counter AFCNT is increased by one and the number of times of distance measurement is counted.

At step (006), the "photometry" sub-routine for exposure control is executed. The computer PRS inputs the output SSPC of the photometering sensor SPC shown in FIG. 9 to the analog input terminal, A/D-converts it, calculates an optimum shutter control value and an optimum aperture control value from the digital photometric value thereof and stores them into the predetermined addresses of the RAM. During the release operation, it effects the control of the shutter and aperture on the basis of these values.

Figure 11:
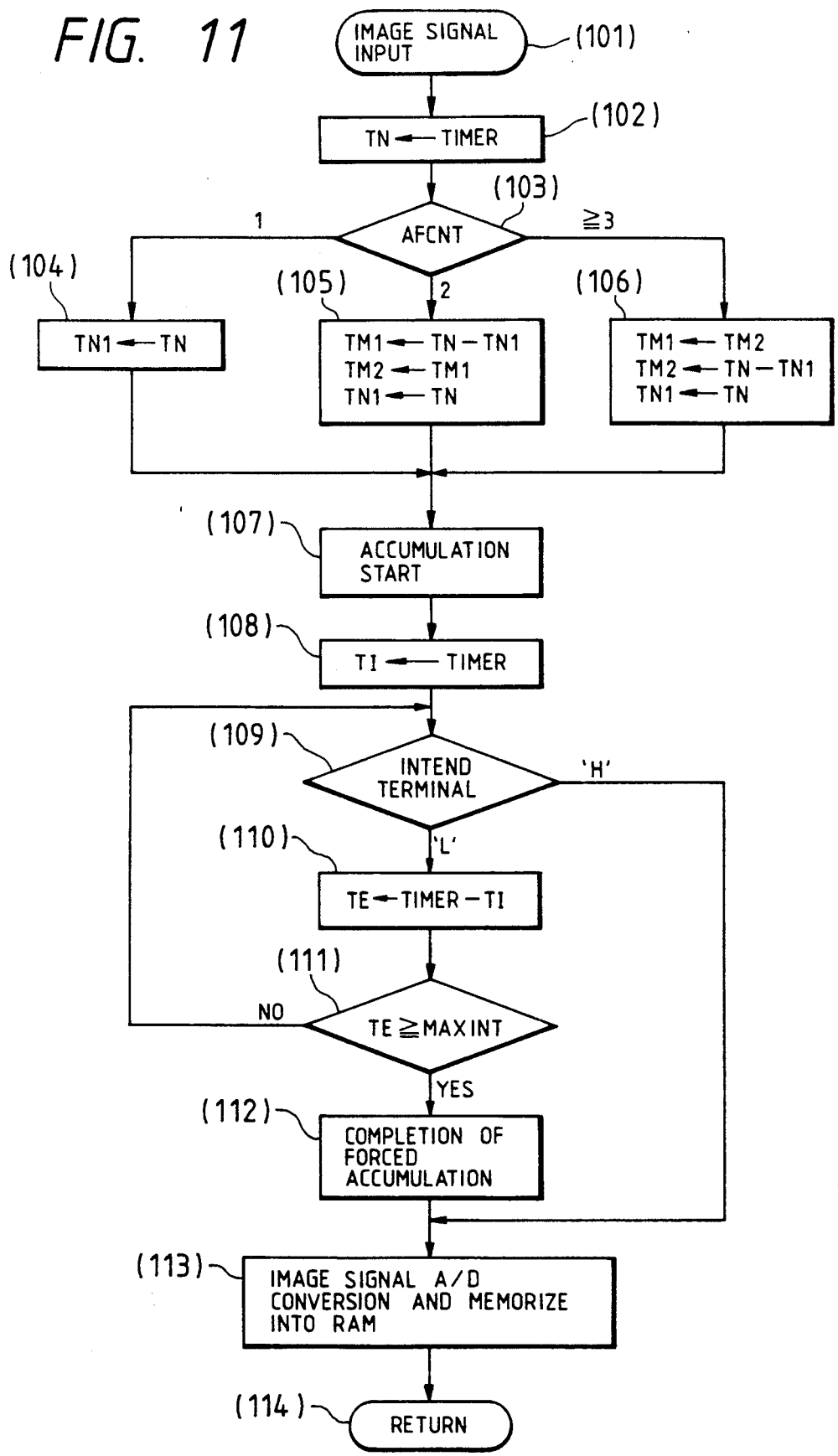
FIG. 11 is a program flow chart showing the image signal input sub-routine in FIG. 10.

Subsequently, at step (007), the "image signal input" sub-routine is executed. The flow of this sub-routine is shown in FIG. 11, and the computer PRS effects the inputting of an image signal from the sensor device SNS for focus detection. The details of it will be described later.

At the next step (008), the defocus amount DEF of the photo-taking lens is calculated on the basis of the input image signal. The specific calculation method is disclosed in Japanese Patent Application No. 61-160824 by the assignee and therefore need not be described in detail.

At step (009), the detection of the content of the counter AFCNT is effected, and if AFCNT=1, the foreseeing calculation is not yet accomplished and therefore, DEF at step (007) is used as the lens driving amount DL, and at step (011), the "lens driving" sub-routine is executed. The step (011) will be described later. After the lens driving is completed, a return is made to step (002).

When at step (009), AFCNT=2, that is, there are two measured distance data, it is possible to approximate the position of the image plane of the object by a linear function and therefore, at step (012), the sub-routine of "foreseeing calculation 1" by a linear function is executed, and at step (013), "lens driving" is effected. At step (014), the state of the release switch SW2 is detected, and this will be described later in connection with the SW2 interruption operation to be described. Here, a return is made to step (002) with the switch SW2 being OFF.

When at step (009), AFCNT≧3, that is, there are three or more measured distance data, the foreseeing calculation using a quadratic function is effected in the "foreseeing calculation 2" sub-routine of step (015), and step (016) is executed and a return is made to step (002).

The steps (011), (013) and (016) are the same lens driving sub-routine.

A description will now be given of a case where the release interruption by the closing of the switch SW2 is applied when the steps (005)–(016) encircled by a broken line are being executed. The switch SW2, as previously described, is connected to the interruption input terminal of the computer PRS, and the design is such that when the switch SW2 is closed, a shift is immediately made to step (021) by the interruption function even when any step is being executed.

When the SW2 interruption of step (021) is applied when the steps encircled by the broken line are being executed, the state of the counter AFCNT is detected at step (022). When AFCNT≦2, the lens correction using the foreseeing calculation is not yet completed and therefore, at step (023), an interruption return is made to the original step.

That is, when AFCNT=1, it means that an interruption has been made in the first focus detecting operation cycle, i.e., in the flow of steps (005)–(011) and therefore, an interruption return is made to the original step and finally, step (011) is executed and a return is made to step (002).

When AFCNT=2, it means that an interruption has been made in the second focus detecting operation cycle, i.e., in the flow of steps (005)–(013) and therefore, again an interruption return is made to step (014). At step (014), the state of the switch SW2 is detected, but this is the flow after the interruption return and therefore, the switch SW2 is ON and a shift is made to the release of step (025). The step (025) and subsequent steps will be described later.

If at step (022), AFCNT=3, that is, an interruption has been made into the flow of steps (005)–(016), the lens is forcedly stopped at step (024), and a shift is made to the "release" of step (025). That is, in this case, the foreseeing calculation and lens driving by primary approximation have been completed and therefore, a shift may be immediately made to the release operation. The step (025) will be described later. Subsequently, at step (026), winding-up of film is effected, and the film is wound up by one frame by properly controlling the motor controlling signals M1F and M1R shown in FIG. 9, but a detailed description of this operation is omitted.

The image signal input sub-routine shown in FIG. 11 will now be described.

The "image signal input" sub-routine is an operation executed at the beginning of a new focus detecting operation, and when this sub-routine is called, at step (102) via step (101), the timer value TIMER of a self-running timer in the microcomputer PRS itself is stored in the memory area TN on the RAM, whereby the starting time of the focus detecting operation is memorized.

At the next step (103), the state of the counter AFCNT is detected, and if AFCNT=1, it means the first focus detection and therefore, the focus detecting operation time interval does not exist and accordingly, TN is only stored in TN1 and an advance is made to step (107).

When AFCNT=2, linear function approximation is effected and therefore, the time interval TM1 between the last and the current focus detecting operation is defined by TM1←TN−TN1 (TN is the starting time of the current focus detecting operation and TN1 is the starting time of the last focus detecting operation defined at step (104) and consequently, TN−TN1 is the focus detecting operation time interval). Also, TM2←TM1 is defined. In primary approximation, TM2 is a meaningless value, but the reason why this has been defined will be described later. Then, TN is stored in TN1 and renewal of TN1 is effected.

When AFCNT≧3, there are two focus detecting operation time interval data TM1 and TM2 to be renewed and therefore, renewal is effected by the equation of step (106), and renewal of TN1 is also effected in the same manner as step (105). TM1 when AFCNT=3 is TM1 defined at step (105), but renewal TM1←TM2 is effected and for that purpose, TM2 also must be defined. This is the reason why the apparently meaningless TM2 has been defined at step (105). That is, when AFCNT=3, the TM1 defined when AFCNT=2 remains as TM1, and when AFCNT≧4, renewal TM1←TM2 is effected.

Now, at the next step (107), the sensor device SNS is caused to start to accumulate the optical image. Specifically, the microcomputer PRS delivers an "accumulation start command" to the sensor driving circuit SDR by communication, and in response thereto, the driving circuit SDR renders the clear signal CLR of the photoelectric conversion element portion of the sensor device SNS into 'L' and causes the sensor device to start accumulation of charges.

At step (108), the timer value of the self-running timer is stored in a variable TI and the current time is memorized.

At the next step (109), the state of the input INTEND terminal of the computer PRS is detected and whether the accumulation has been completed is examined. The sensor driving circuit SDR renders the signal INTEND into 'L' simultaneously with the start of the accumulation and monitors the AGC signal SAGC from the sensor device SNS, and when the signal SAGC reaches a predetermined level, the sensor driving circuit renders the signal INTEND into 'H' and causes the charges of the photoelectric conversion element portion to be transferred to the CCD portion.

If at step (109), the INTEND terminal is at 'H', it means that the accumulation has been completed and thus, a shift is made to step (113), and if the INTEND terminal is at 'L', it means that the accumulation is not yet completed and thus, a shift is made to step (110).

At step (110), the time TI memorized at step (108) is subtracted from the timer value TIMER of the self-running timer and the result is stored in said TE. Thus, the time from the start of the accumulation until now, i.e., the so-called accumulation time, is stored in the TE.

At the next step (111), TE is compared with a constant MAXINT, and if TE is less than MAXINT, a return is made to step (109), where the completion of the accumulation is again waited for. When TE becomes greater than MAXINT, a shift is made to step (112), where the accumulation is forcedly completed.

The forced completion of the accumulation is executed by an "accumulation completion command" being delivered from the computer PRS to the driving circuit SDR. When the "accumulation completion command" is sent from the computer PRS to the driving circuit SDR, the driving circuit SDR renders a charge transfer signal SH into 'H' for a predetermined time and causes the charges of the photoelectric conversion element portion to be transferred to the CCD portion. The accumulation by the sensor is completed by the flow up to step (112).

At step (113), a signal AOS resulting from amplifying the image signal OS of the sensor SNS by the sensor driving circuit SDR is A/D-converted and the digital signal resulting therefrom is stored in the RAM. More particularly, the sensor driving circuit SDR produces clocks $\phi 1$ and $\phi 2$ for driving the CCD in synchronism with the clock CK from the computer PRS and imparts them to the control circuit in the sensor device SNS, and the sensor device SNS has its CCD portion driven by the clocks $\phi 1$ and $\phi 2$ and the charges in the CCD are time-serially output as an image signal from the output OS. This signal is amplified by an amplifier in the sensor driving circuit SDR, whereafter it is input as AOS to the analog input terminal of the computer PRS. The computer PRS effects A/D conversion is synchronism with the clock CK the computer itself is outputting, and stores the digital image signal after the A/D conversion/ at the predetermined address of the RAM.

When the inputting of the image signal is completed in this manner, at step (114), the "image signal input" sub-routine is returned to the main program.

FIG. 12 shows the flow chart of the "lens driving" sub-routine.

When this sub-routine is executed, at step (202), communication is effected with the lens and two data "S" and "PTH" are input. "S" is the "coefficient of the defocus amount vs. the amount of axial movement of the focus adjusting lens" inherent to the photo-taking lens, and for example, in the case of a totally moved type single lens, the entire photo-taking lens is a focus adjusting lens and therefore, S=1, and in the case of a zoom lens, S is varied by each zoom position. "PTH" is the amount of axial movement of the focus adjusting lens LNS per pulse of the output of the encoder ENCF operatively associated with the movement of the focus adjusting lens LNS in the direction of the optic axis.

Thus, the value resulting from converting the amount of axial movement of the focus adjusting lens into the output pulse number of the encoder by the defocus amount DL to be focus-adjusted and said S and PTH, i.e., the so-called lens driving amount FP, is given by the following equation:

$$FP = DL \times S / PTH$$

Step (203) executes the above equation as it is.

At step (204), FP found at step (203) is delivered to the lens and the driving of the focus adjusting lens (in the case of a totally moved type single lens, the entire photo-taking lens) is commanded.

At the next step (205), communication is effected with the lens and whether the driving by the lens driving amount FP commanded at step (204) has been completed is detected, and when the driving is completed, a shift is made to step (206), where the "lens driving" sub-routine is returned to the main program.

This sub-routine is common in all of the steps (011), (013) and (016).

The detection of the completion of the driving by said lens driving amount FP is executed by the lens driving amount FP being input to a counter in the control circuit LPRS by said communication, and the coincidence between the value of this counter and the count value of the pulse SENCF output from the encoder ENCF with the lens driving being detected by the control circuit LPRS.

FIG. 13 shows the flow chart of foreseeing calculation 1. This a flow in which when there are two focus detecting operation data, the position of the image plane of the object is approximated by a linear function and the position of the image plane in the future is foreseen.

First, at step (302), it is assumed that the time interval TM2 from the current focus detecting operation to the next focus detecting operation is equal to the time interval TM1 from the last focus detecting operation to the current focus detecting operation. At step (303), the defocus amount DEF obtained in the current focus detecting operation is stored in memory DF2, and at step (304), the last driving amount DL is stored in a memory DL1.

At step (305), p is found in accordance with the equation (13) and the result is P, but in this equation, DL1 and DF1 have been defined at the step (010) of FIG. 10.

At step (306), the current lens driving amount DL is calculated in accordance with the equation (15), and at step (307), a return is made to the main program.

Figure 14:
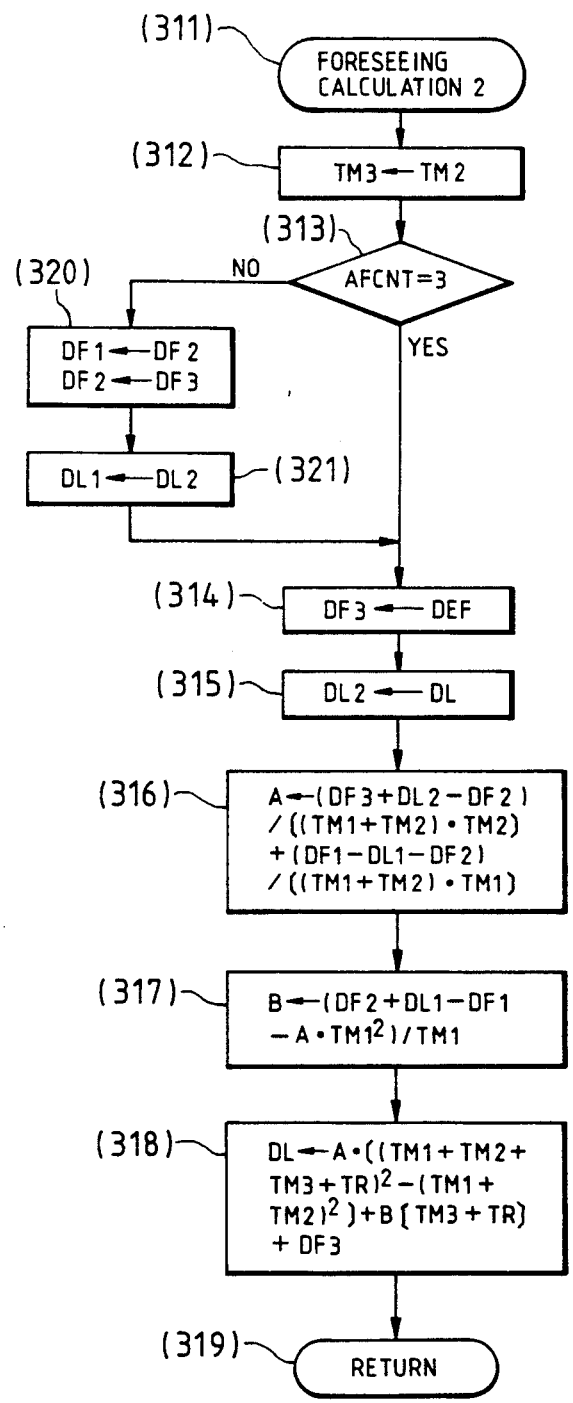
FIG. 14 is a program flow chart showing the foreseeing calculation 2 sub-routine in FIG. 10.

FIG. 14 shows the flow chart of foreseeing calculation 2. This a flow in which when there are three or more data in the focus adjusting cycle, the position of the image plane of the object is approximated by a quadratic function on the basis of the data obtained by the execution of the latest three cycles and the position of the image plane in the future is foreseen.

First, at step (312), it is assumed that the time interval TM3 from the current focus adjusting cycle to the next focus adjusting cycle is equal to the time interval TM2 from the last focus adjusting cycle to the current focus adjusting cycle, and the data of memory TM2 is input to memory TM3.

At step (313), the state of the counter AFCNT is detected, and when AFCNT=3, that is, when this sub-routine is called for the first time, an advance is made to step (314). At step (314), the current detected defocus amount DEF found in the current focus detection calculation sub-routine is stored in memory DF3 and an advance is made to step (315), where the last lens driving amount data DL is input to memory DL2. This data DL is the data input at step (306).

At step (316), calculation of the equation (5) or (8) is effected to find $a_n$. The then data of the memories DF2, DF1 and DL1 are the data in the last focus detecting operation cycle, i.e., the primary approximation foreseeing data, and on the basis of these data, the last lens driving amount and the current defocus amount obtained at the steps (314) and (315) and the before-last and last focus adjusting cycle time interval data found at step (106) and input to the memories TM1 and TM2, calculation of the equation (5) is effected to find an, and this is placed as A.

At step (317), $b_n$ is found in accordance with the equation (6) or (9), and this is placed as B. As the data at this step use is also made of the data input to the memories DF2, DF1 and DL1 and the memory TM1.

At step (318), calculation of the equation (11) is effected to find the current lens driving amount DL.

The driving amount DL at this time is found from the equation (11) and therefore is an amount for making the position of the image plane of the object which takes the release time lag into consideration coincident with the position of the image plane of the lens, whereby foreseeing calculation 2 for accomplishing the above-mentioned coincidence between the positions of the image planes is completed and a return is made to step (319).

Also, when at the step (313) in the foreseeing calculation sub-routine, AFCNT≠3, that is, AFCNT ≧4, steps (320) and (321) are executed.

At step (320), the data of the memory DF2 is input to DF1. Before the current sub-routine is executed, the last defocus amount is input to the memory DF2, but at the point of time whereat the current sub-routine is executed, the content of the memory DF2 is the before-last defocus amount and therefore, this is input to the memory DF1.

The content of the memory DF3 also is the last defocus amount at the point of time whereat the current sub-routine is executed and therefore, this is input to the memory DF2. The focus adjusting cycle is executed by the processing of this step (320), and each time a new defocus amount is found, the contents of the memories DF1 and DF2 are successively renewed and thus, the before-last defocus amount is always stored in the memory DF1 and the last defocus amount is always stored in the memory DF2.

Also, at step (321), the data of the memory DL2 is input to the memory DL1. This processing also is for the same purpose as the step (320) and thus, the last lens driving amount is always stored in the memory DL1.

Thereafter, steps (314) and (315) are executed, and the current defocus amount is input to the memory DF3 and the lens driving amount DL found at the step (318) of the last foreseeing calculation sub-routine, i.e., the last lens driving amount, is input to DL2, and the steps (316)–(318) are executed on the basis of these data, and a lens driving amount DL for realizing that even when the focus adjusting cycle is effected four or more times, the position of the image plane of the lens at the end of each cycle is the position which takes the release time lag into consideration is found.

Figure 15:
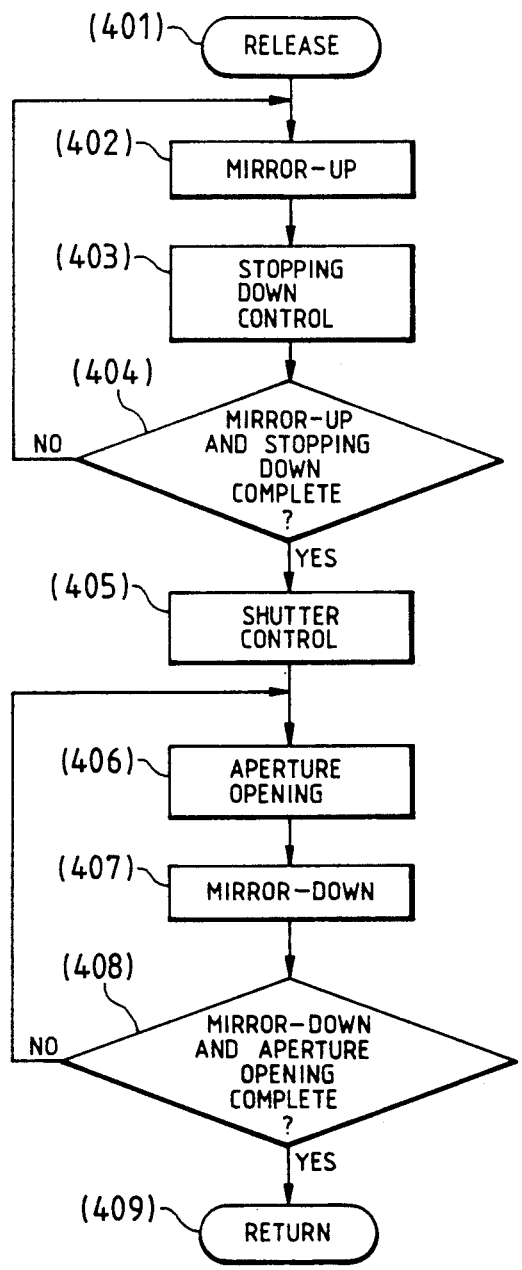
FIG. 15 is a program flow chart showing the release sub-routine in FIG. 10.

FIG. 15 shows the flow of the release sub-routine

First, at step (402), the mirror-up movement of the quick return mirror of the camera is effected. This is executed by controlling the motor MTR2 through the drive circuit MDR2 by the use of the motor controlling signals M2F and M2R shown in FIG. 9.

At the next step (403), the aperture control value already stored by the photometry sub-routine of the previous step (006) is delivered to the lens, whereby the lens is caused to effect aperture control.

Whether the mirror-up movement and the aperture control of steps (402) and (403) have been completed is detected at step (404), but several tens of milliseconds are usually required for these two functions and this is the main factor of what is called the release time lag.

At step (404), whether the movement and the aperture control of the previous steps (402) and (403) have already been completed is detected. The mirror-up movement can be confirmed by a detection switch, not shown, which is attendant on the mirror, and the aperture control is confirmed by communication as to whether the lens has been driven to a predetermined aperture value. When one of these two is not yet completed, a standby is effected at this step and the detection of the state is continuedly effected. When the two functions are confirmed, a shift is made to step (405). At this point of time, the preparation for exposure has been made.

At step (405), control of the shutter is effected at the shutter control value already stored by the photometry sub-routine of the previous step (006) and the film is exposed.

When the control of the shutter is completed, at step (406), a command for making the aperture fully open is sent to the lens, and subsequently at step (407), mirror-down movement is effected. Mirror-down, like mirror-up, is executed by controlling the motor MTR2 by the use of the motor controlling signals M2F and M2R.

At the next step (408), as at step (404), completion of the mirror-down movement and the aperture opening control are waited for. When the mirror-down movement and the aperture opening control are both completed, a shift is made to step (409) and a return is made to the main program. in the first focus detecting operation cycle after Summing up the above-described flows, in the first focus detecting operation cycle after the closing of the switch SW1 in FIG. 10, lens driving is effected in accordance with the value of the defocus amount DEF detected by the flow of steps (005)–(011), and in the second focus detecting operation cycle, the foreseeing driving using the linear functional equation (the equation (15) is effected by the flow of steps (005)–(013) depending on the result of the last focus adjustment and the result of the current focus detecting operation, and in the third and subsequent focus detecting operation cycles, the foreseeing driving using the quadratic functional equation (11) is effected by the flow of steps (005)–(016) depending on the result of the past two focus adjustments and the result of the current focus detection.

When a release interruption is made by the closing of the switch SW2 during said focus detecting operation cycle, if said cycle is the first focus detecting operation cycle, an interruption return is immediately made and said flow (005)–(011), is executed without effecting the release, whereafter return is made to step (002). If said cycle is the second focus detecting operation cycle, again an interruption return is made, but at step (014), a shift is made to the release operation. That is, when the switch SW2 has closed a short time after the closing of the switch SW1, release is effected after the focus adjusting operation has been performed twice. When release interruption has come in the third and subsequent focus detecting operation cycles, a shift is immediately made to the release operation.

In the embodiment described above, when the number of the focus detecting operation cycles in the past is below a predetermined number of times, foreseeing calculation is effected on the basis of a low-order (first-order) functional equation and lens driving is effected, and when said number is over the predetermined number of times, foreseeing calculation is effected on the basis of a high-order (second-order) functional equation and lens driving is effected and thus, the lens driving for making the position of the image plane of the object coincident with the position of the lens is effected in a short time after the first focus detecting operation cycle is started.

In the above-described embodiment, the linear functional equation and the quadratic functional equation are changed over and used, but if the number of the focus detecting operation cycles is increased, still a higher-order functional equation may be used.

Also, in the above-described embodiment, the quadratic function is a parabola, but of course, instead of it, a circle, an ellipse or a hyperbolic function may be used.

Figure 16:
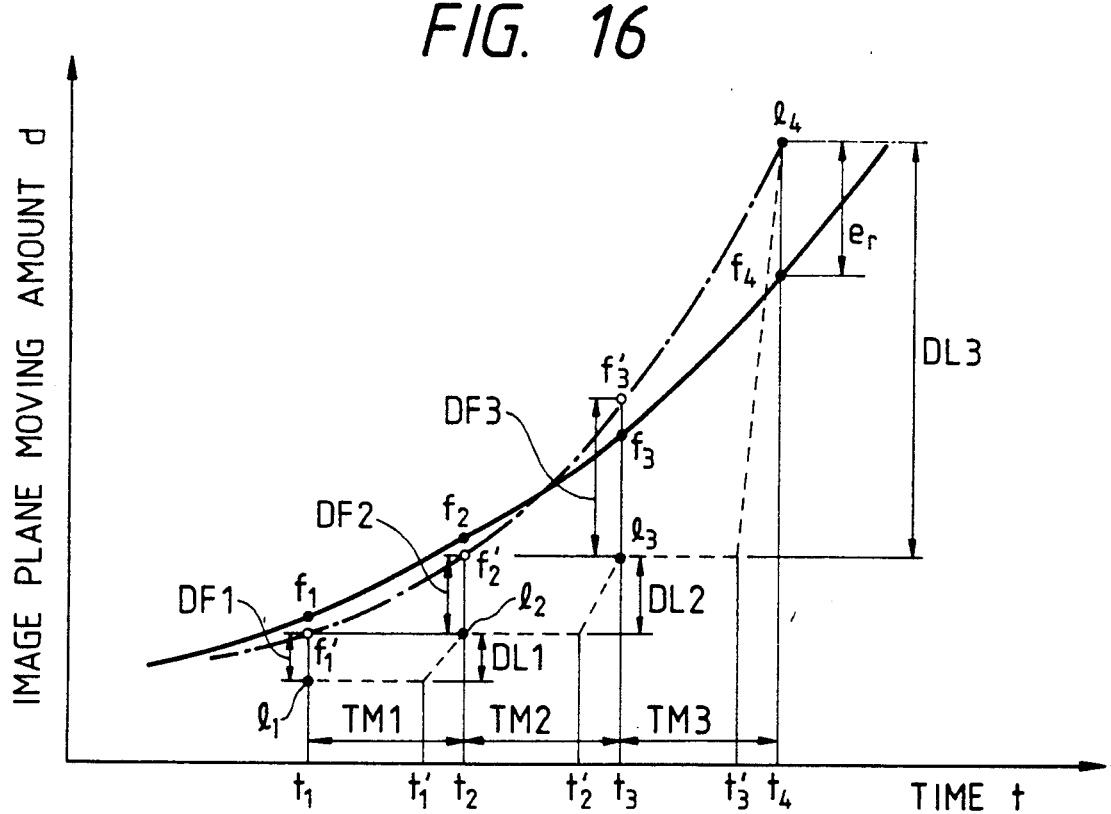
FIG. 16 illustrates the problems in the focus adjusting operation shown in FIG. 2.
Figure 17:
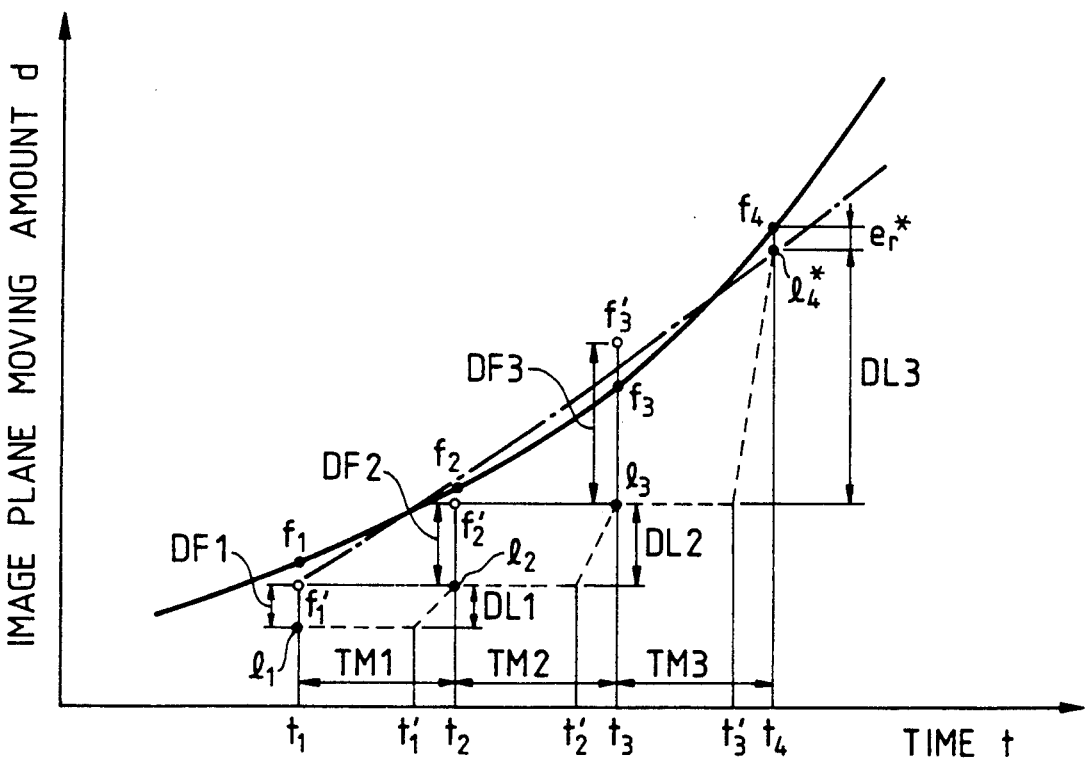
FIG. 17 illustrates the principle of the operation of another embodiment of the focus adjusting device of the present invention.

FIG. 17 illustrates the principle of another embodiment of the focus adjusting operation using the foreseeing calculation of the present invention, and the conditions of FIG. 17 are the same as those of FIG. 16. In FIG. 17, when the positions of the image plane of the object are brought to $f_1'$, $f_2'$ and $f_3'$ by the detected defocus amounts DF1, DF2 and DF3 at times $t_1$, $t_2$ and $t_3$, a linear function is found from these three points by the minimum square method and it is extrapolated at a time $t_4$ to thereby find the lens driving amount DL3. Accordingly, at the time $t_4$, the position of the image plane of the lens is $l_4^*$, and the out-of-focus amount is $er^*$ relative to the actual position of the image plane of the object, and the error becomes markedly small as compared with the case of FIG. 16.

Where the conditions of the object are thus bad and the accuracy of the detected defocus amount is low, it is seen that it is better to approximate a linear function by the minimum square method than by a calculation equation in which extrapolation is effected by a quadratic function. Also, of course, where conversely, the accuracy of the detected defocus amount is high, the extrapolation using a quadratic function can anticipate a smaller error than the minimum square method.

That is, if the linear function approximation of the minimum square method is selected as the correction calculation equation when the amount of contrast as the result of focus detection is lower than a predetermined value and if a quadratic function is selected as the correction calculation equation when said amount of contrast is higher than the predetermined value, it will become possible to accomplish more accurate lens driving.

The specific calculation method for the linear function approximation by the minimum square method is as follows. The coefficient d of a linear function $$d \cdot t + DF1 = f(t) \quad (20)$$

which passes through $f_1' = (0, DF1)$ is found at two points, $f_2' = (TM1, DF2 + DL1)$ and $f_3' = (TM1 + TM2, DF3 + DL2 + DL1)$, by the minimum square method.

The square sum ER of the error of the equation (20) is $$\begin{aligned} ER &= \Sigma \{f(t) - dt\}^3 \\ &= \{DF2 + DL1 - d \cdot TM1\}^2 + \\ &\quad \{DF3 + DL2 + DL1 - d \cdot (TM1 + TM2)\}^2. \end{aligned} \quad (21)$$

To find the coefficient d for which the equation (21) is minimum, the same equation is partially differentiated and placed as 0.

$$\begin{aligned} \frac{\partial}{\partial d} ER &= 2\{DF2 + DL1 - d \cdot TM1\}(-TM1) + \\ &\quad 2\{DF3 + DL2 + DL1 - d(TM1 + TM2)\} \cdot \\ &\quad (-TM1 - TM2) = 0 \end{aligned} \quad (22)$$

From the equation (22), the coefficient d is $$d = \frac{(DL1 + DF2 - DF1)TM1 + (DL1 + DL2 + DF3 - DF1)(TM1 + TM2)}{TM1^2 + (TM1 + TM2)^2} \quad (23)$$

Consequently, the lens driving amount DL3 as converted into the amount of movement of the image plane at the time $t_4$ is $$\begin{aligned} DL3 &= f_4' - l_3 \\ &= f_4' - (f_3' - DF3) \\ &= (f_4' - f_3') + DF3 \\ &= d\{(TM1 + TM2 + TM3) - (TM1 + TM2)\} + DF3 \\ &= d \cdot TM3 + DF3. \end{aligned} \quad (24)$$

Figure 2:
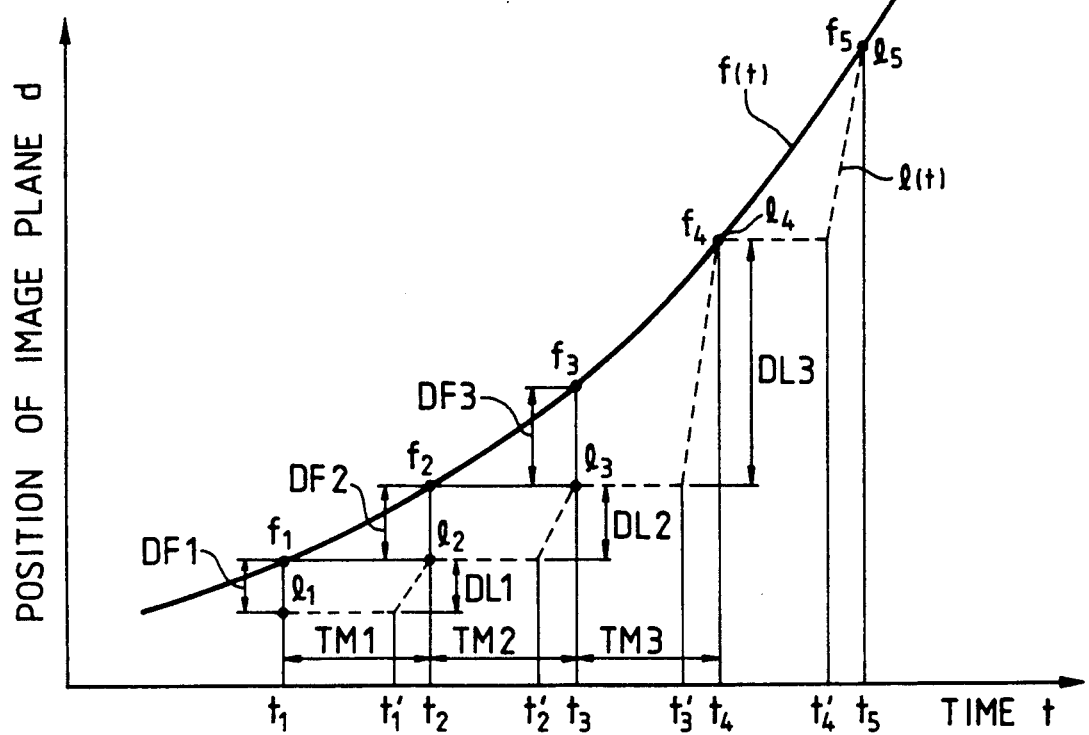
FIG. 2 illustrates the focus adjusting operation using the foreseeing operation.
Figure 3:
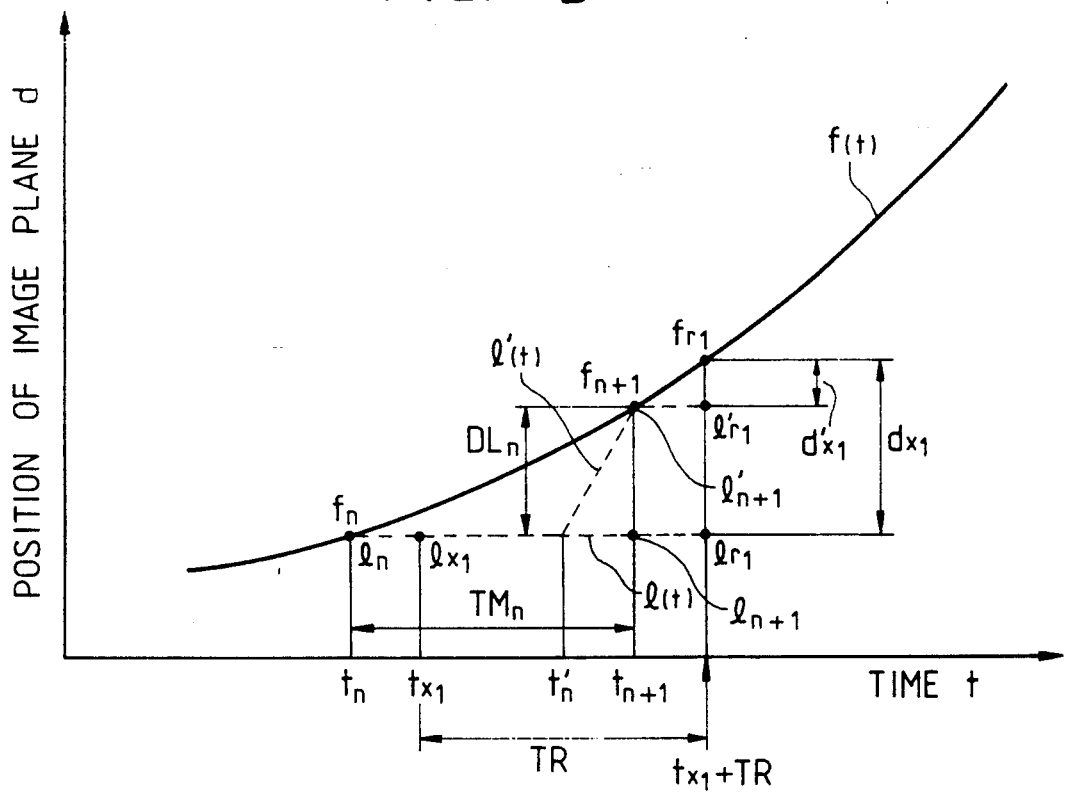
FIGS. 3 and 4 illustrate the details of the focus adjusting operation shown in FIG. 2.
Figure 4:
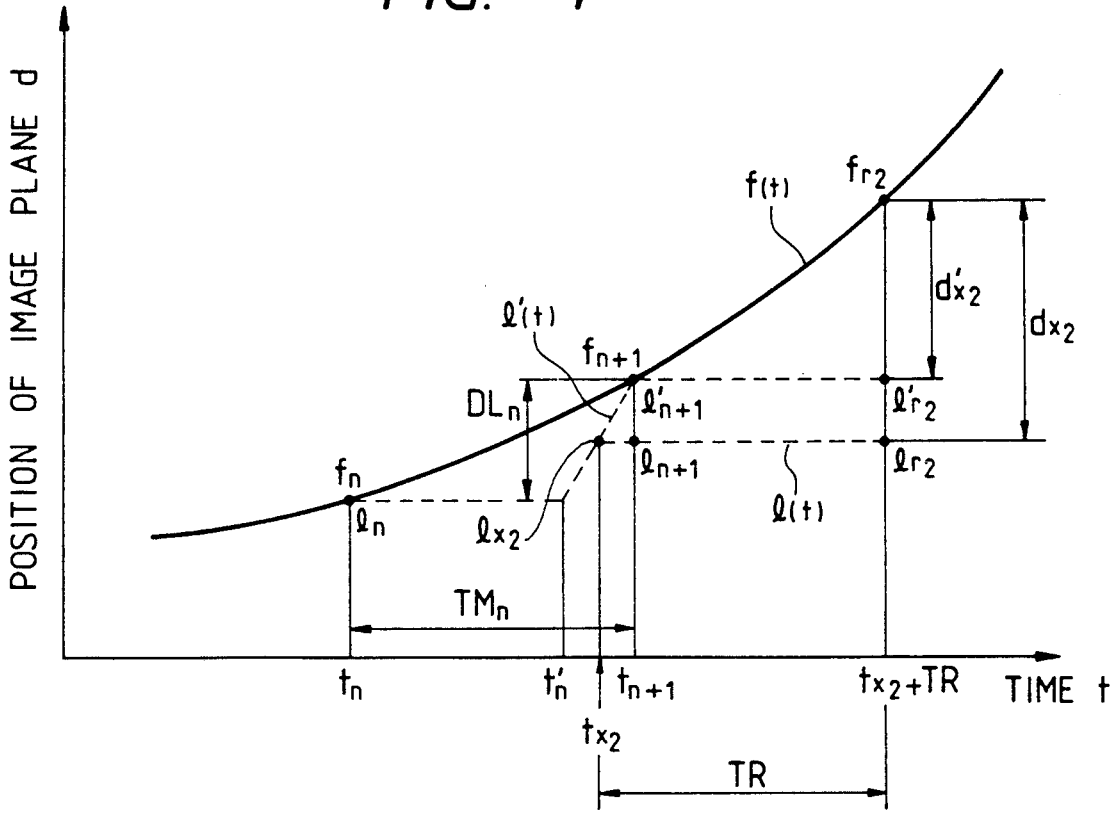
Figure 5:
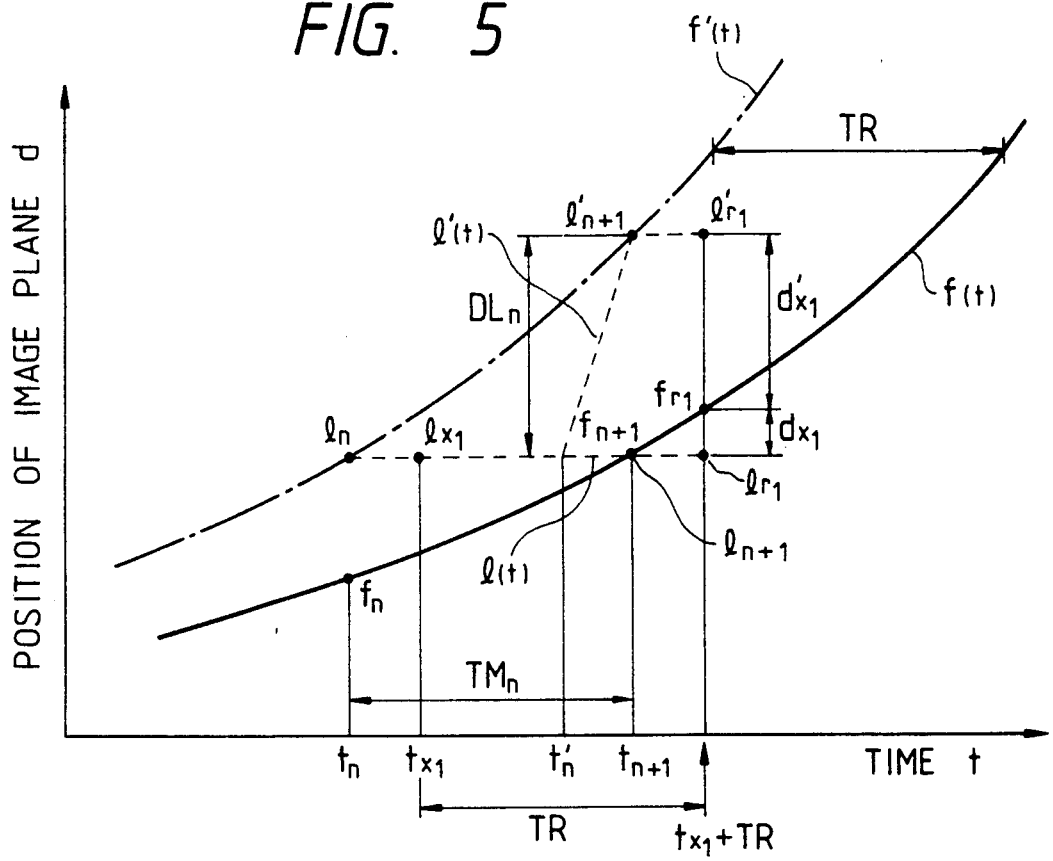
FIGS. 5, 6 and 7 illustrate modifications of the focus adjusting operation using the foreseeing operation shown in FIG. 2.
Figure 6:
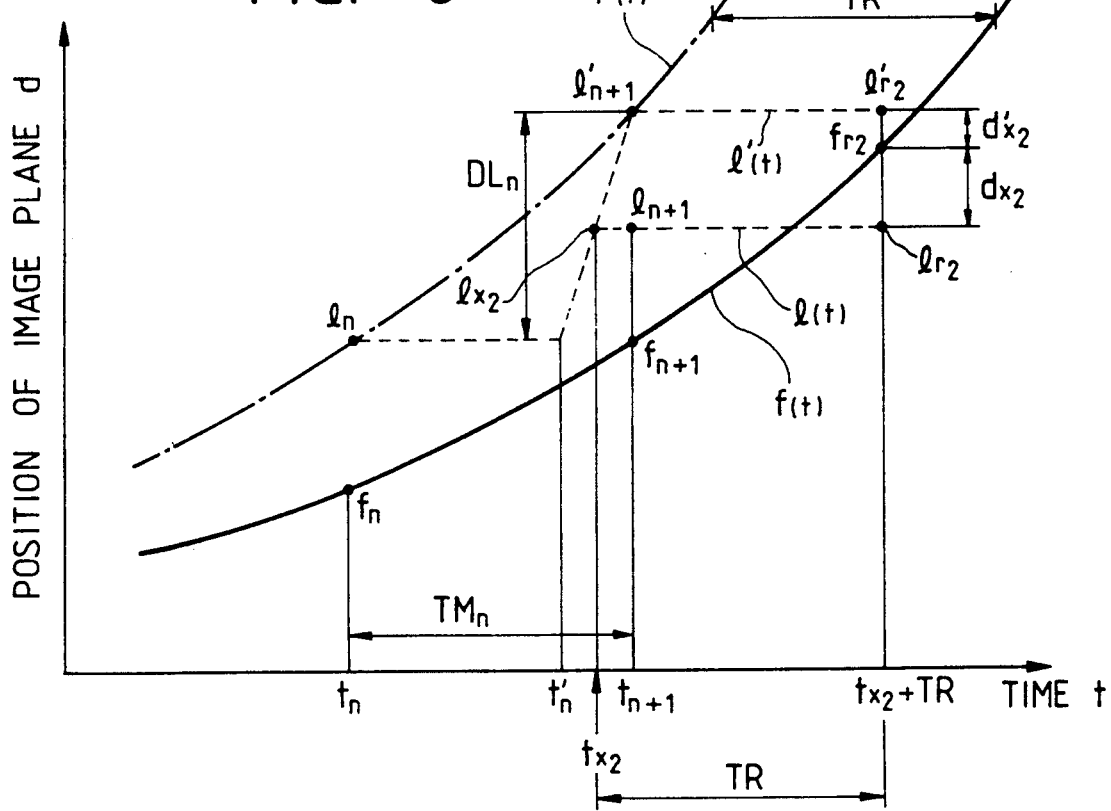

A description will hereinafter be given of a specific controlling operation for a focus adjusting device provided with both of the foreseeing operation for the linear function shown in FIG. 17 and the foreseeing operation for the quadratic function shown in FIG. 2.

FIG. 18 is a program flow chart showing the general operation of a camera which performs the foreseeing operation of FIG. 17. In this flow of FIG. 18, the state of the switch SW1 adapted to be closed by the first-stage depression of the release button is first detected at step (002) via step (001), and when the switch SW1 is OFF, a shift is made to step (003), where flags for control and variables set in the RAM in the computer PRS are all cleared and initialized.

The steps (002) and (003) are repetitively executed until the switch SW1 becomes ON or the power source switch becomes OFF. By the switch SW1 becoming ON, a shift is made from step (002) to step (004).

At step (004), the "photometry" sub-routine for exposure control is executed. The computer PRS inputs the output SSPC of the photometric sensor SPC shown in FIG. 9 to the analog input terminal and A/D-converts it, and calculate an optimum shutter control value and an optimum aperture control value from the digital photometric value, and stores them at the predetermined addresses of the RAM. During the release operation, the shutter and the aperture are controlled on the basis of these values.

Subsequently, at step (005), the "image signal input" sub-routine is executed. The flow of this sub-routine is shown in FIG. 19A, and the computer PRS effects the inputting of an image signal from the sensor device SNS for focus detection. The details of it will be described later.

At the next step (006), the "focus detection" sub-routine is executed, and the defocus amount DEF of the photo-taking lens and the amount of contrast ZD are calculated on the basis of the input image signal. The specific, calculation method is disclosed in the assignee's Japanese Patent Application No. 61-160824, etc. and therefore need not be described in detail.

Figure 20:
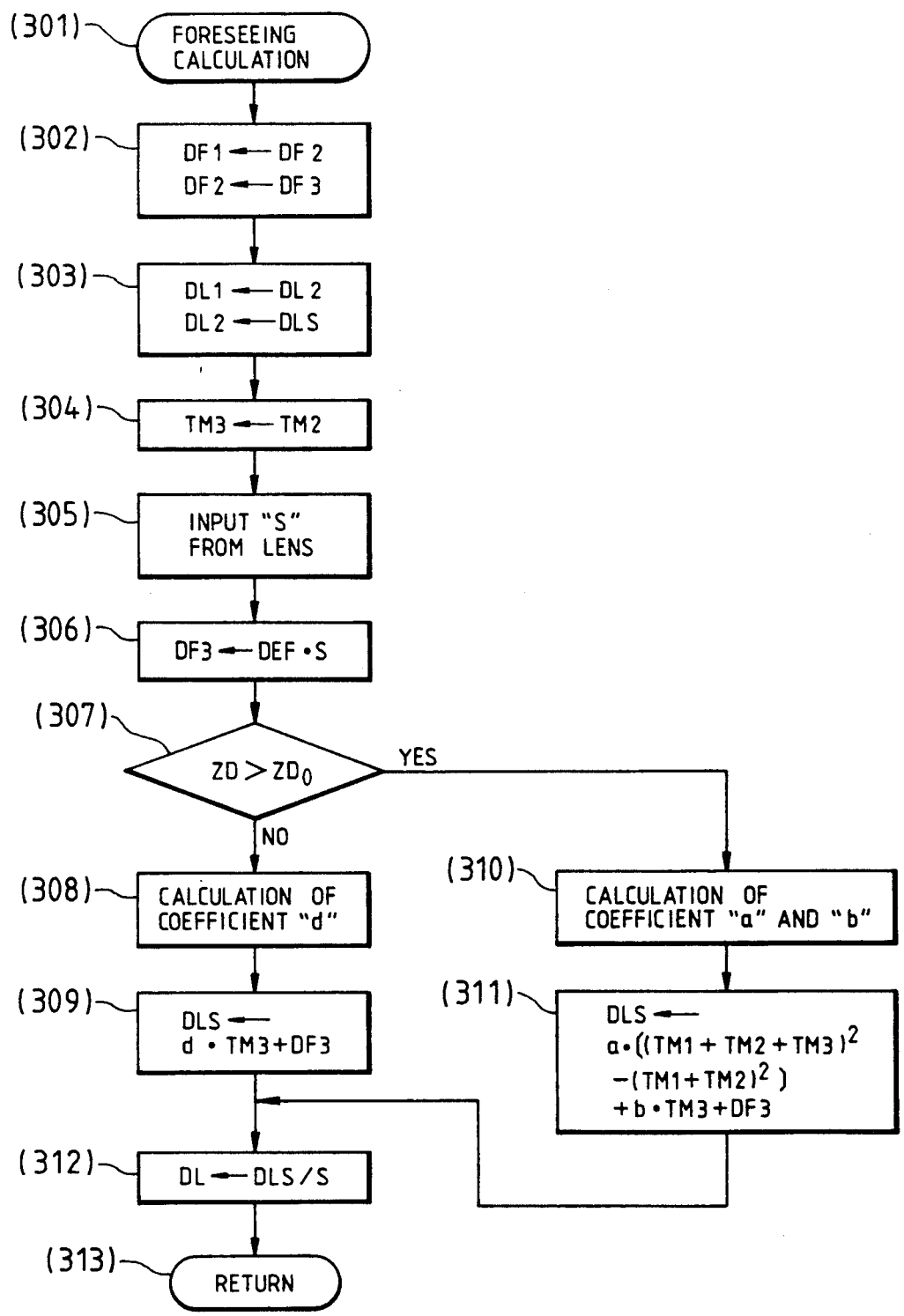
FIG. 20 is a program flow chart showing the foreseeing calculation sub-routine in the flow of FIG. 18.

At the next step (007), the "foreseeing calculation" sub-routine is executed. In the "foreseeing calculation" sub-routine, correction of the lens driving amount is effected on the basis of the aforementioned equations, and the flow thereof is shown in FIG. 20.

Subsequently, at step (008), the "lens driving" sub-routine is executed, and lens driving is effected on the basis of the defocus amount DL corrected at the previous step (007). The flow of the "lens driving" sub-routine is shown in FIG. 19B. This routine is constructed by the same flow as the flow of the first embodiment of FIG. 12.

After the completion of the lens driving, is shift is again made to step (002), and step (004) to step (008) are repetitively executed until the switch SW1 becomes OFF, and preferable focus adjustment is effected even for a moving object.

The switch SW2 adapted to be closed by the second-stage depression of the release button is connected to the interruption input terminal of the computer PRS, and it is to be understood that the design is such that when the switch SW2 becomes ON, a shift is immediately made to the step of the release operation by the interruption function even if any step is being executed.

A description will now be made of the "image signal input" sub-routine shown in FIG. 19A.

The "image signal input" is the operation which is executed at the beginning of the cycle of each focus adjusting operation, and when this sub-routine is called, at step (102) via step (101), the timer value TIMER of the self-running timer in the microcomputer PRS itself is stored in the memory area TN of the RAM, whereby the starting time of the focus adjusting operation is memorized.

At the next step (103), the contents of the memories TM1 and TM2 which memorize the time intervals $TM_{n-2}$ and $TM_{n-1}$ in the lens driving amount correction equations (8), (9) and (10) are renewed. That is, before the step (103) is executed, the time intervals $TM_{n-2}$ and $TM_{n-1}$ in the before-last and last focus adjusting operations are memorized in the memories TM1 and TM2, and the time when the last focus adjusting operation was started is memorized in TN1.

Accordingly, when at step (103), TN−TN1 (the time interval from the last focus adjusting operation to the current focus adjusting operation) is found and is input to the memory TM2 and the content of the memory TM2 until then is input to TM1, they are stored as the before-last and last time data $TM_{n-1}$ and $TM_{n-2}$ in the memory areas TM1 and TM2, respectively, in the RAM which corresponds to $TM_{n-2}$ and $TM_{n-1}$ in the equations (8), (9) and (10). The current time TN is stored into TN1 for the next focus adjusting operation.

Now, at the next step (104), the sensor device SNS is caused to start the accumulation of the optical image. Specifically, the microcomputer PRS delivers an "accumulation start command" to the sensor driving circuit SDR by communication, and in response thereto, the sensor driving circuit SDR renders the clear signal CLR of the photoelectric conversion element portion of the sensor device SNS into 'L' and causes it to start the accumulation of charges.

At step (105), the timer value of the self-running timer is stored in a variable TI and the current time is memorized.

At the next step (106), the state of the input INTEND terminal of the computer PRS is detected and whether the accumulation has been completed is examined. The sensor driving circuit SDR has a structure which renders the signal INTEND into 'L' simultaneously with the start of the accumulation, monitors the AGC signal SAGC from the sensor device SNS, renders the signal INTEND into 'H' when the AGC signal SAGC reaches a predetermined level, and at the same time, renders the charge transfer signal SH into 'H' for a predetermined time and causes the charges of the photoelectric conversion element portion to be transferred to the CCD portion.

If at step (106), the INTEND terminal is at 'H', it means the completion of the accumulation and a shift is made to step (110), and if the INTEND terminal is at 'L', it means that the accumulation is not yet completed and a shift is made to step (107).

At step (107), the time TI memorized at step (105) is subtracted from the timer value TIMER of the self-running timer and the result is stored in a variable TE. Thus, the time from the start of the accumulation until the completion of the individual accumulations, i.e., the so-called "accumulation time", is stored in TE.

At the next step (108), TE is compared with the constant MAXINT, and if TE is less than MAXINT, a return is made to step (106), where the completion of the accumulation is again waited for. If TE becomes equal to or greater than MAXINT, a shift is made to step (109), where the accumulation is forcedly completed. The forced completion of the accumulation is executed by delivering an "accumulation completion command" from PRS to SDR.

When the "accumulation completion command" is delivered from the computer PRS to the driving circuit SDR, the driving circuit SDR renders the charge transfer signal SH into 'H' for a predetermined time and causes the accumulated charges in the photoelectric conversion element portion to be transferred to the CCD portion. The accumulation by the sensor is completed by the flow up to step (109).

At step (110), the A/D conversion of a signal AOS resulting from amplifying the image signal OS of the sensor device SNS by the sensor driving circuit SDR and the storage of the digital signal thereof in the RAM are effected. More particularly, the sensor driving circuit SDR produces clocks $\phi 1$ and $\phi 2$ for driving the CCD in synchronism with the clock CK from the computer PRS and imparts them to a control circuit SSCNT in the sensor device SNS, and the sensor device SNS has its CCD portion driven by the clocks $\phi 1$ and $\phi 2$ and the charges in the CCD are time-serially output as an image signal from the output OS. This signal is amplified by an amplifier in the sensor driving circuit SDR, whereafter it is input as AOS to the analog input terminal of the computer PRS. The computer PRS effects A/D conversion in synchronism with the clock CK output from itself, and stores the digital image signals after the A/D conversion into the predetermined addresses of the RAM in succession.

When the image signal input is thus completed, the "image signal input" sub-routine is returned to the main program at step (111).

FIG. 19 B shows the flow chart of the "lens driving" sub-routine.

When this sub-routine is executed, at step (202), communication is effected with the lens and two data "S" and "PTH" are input. "S" is the "coefficient of the amount of movement of the focus adjusting optical system vs. the amount of movement of the image plane" of the aforementioned photo-taking lens. That is, it is representative of the amount of movement of the image plane of the photo-taking lens when the focus adjusting optical system of the photo-taking lens is moved by a unit length in the direction of the optic axis. For example, in the case of a totally moved type single lens, the entire photo-taking lens corresponds to the focus adjusting optical system and thus, the movement of the focus adjusting optical system is directly the movement of the image plane of the photo-taking lens and therefore, S=1, and in the case of a zoom lens as in the embodiment, the position of the zoom optical system is detected by the encoder circuit ENCZ, and S conforming to the zoom position is determined by the control circuit LPRS.

"PTH" is the amount of movement of the focus adjusting optical system LNS per pulse of the output of the encoder ENCF operatively associated with the movement of the same optical system in the direction of the optic axis.

Thus, the value obtained by converting the amount of movement of the focus adjusting optical system into the output pulse number of the encoder by the defocus amount DL to be focus-adjusted and said S and PTH, i.e., the so-called lens driving amount FP, is given by the following equation:

$$FP = DL \times S / PTH$$

Step (203) executes the above equation as it is.

At step (204), FP found at step (203) is delivered to the lens to thereby command the driving of the focus adjusting optical system.

At the next step (205), communication is effected with the lens and whether the driving by the lens driving amount FP commanded at step (204) has been completed is detected, and when the driving is completed, a shift is made to step (206), where the "lens driving" sub-routine is returned to the main program.

The flow of the "foreseeing calculation" sub-routine will now be described with reference to FIG. 20.

At steps (302) and (303), renewal of data for the current correction calculation is effected. That is, the equations (8), (9) and (10) are represented in the form of a recurrence formula and use a plurality of data in the past from the point of time at which the correction calculation is executed, at that point of time. At step (302), the data of the detected defocus amount as converted into the amount of movement of the lens is renewed, and at step (303), the data of the corrected defocus amount for lens driving as converted into the amount of movement of the lens is renewed. That is, the data of the before-last defocus amount as converted into the amount of movement of the lens is stored in the memory DF1, the data of the last defocus amount as converted into the amount of movement of the lens is stored in the memory DF2, and the data of the before-last and last lens driving amounts are stored in DL1 and DL2.

At the next step (304), the value of TM2 is stored into TM3 corresponding to the time interval TMn from the current focus adjusting operation to the next focus adjusting operation. That is, as described with respect to the equation (10), the time interval TM2 from the last focus adjusting operation to the current focus adjusting operation is assumed as the time interval TM3 from the current focus adjusting operation to the next focus adjusting operation.

At step (305), the lens coefficient "S" is input from the lens, and at the next step (306), the currently detected defocus amount is converted into the amount of movement of the lens. Since the equations (8), (9) and (10) are in the form of a recurrence formula, calculation of DEF·S is effected for the current detected defocus amount DEF, whereby the conversion of all defocus amounts into the amounts of movement of the lens is accomplished.

At the next step (307), the amount of contrast ZD found in the focus detection calculation is compared with a predetermined amount ZD0, and when $ZD > ZD0$, the program branch off to step (310). On the other hand, when $ZD \leq ZD0$, that is, when the contrast is low, a shift is made to step (308), where a calculation for finding the coefficient d shown in the equation (23) is effected. At the next step (309), calculation of the equation (24) is effected to find the value DLS of the defocus amount for lens driving as converted into the amount of movement of the lens.

When at step (307), it is judged that $ZD > ZD0$, that is, the contrast is high, calculation of the equations (8), (9) and (10) is effected at steps (310) and (311).

Then, at step (312), DL=DLS/S is calculated, whereby the amount of movement DLS of the lens is again converted into the defocus amount DL for the "lens driving" sub-routine, and at step (313), the "foreseeing calculation" sub-routine is returned to the main program.

The operations of the essential portions of the present embodiment will now be schematically described in accordance with the above-described flows.

If two or more focus detecting operations and lens drivings were effected in the past, the foreseeing calculation based on the equations (8), (9) and (10) or the equations (23) and (24) becomes possible. Assuming that three or more focus adjusting operations are effected, the contrast found at the current step (006) is judged in the foreseeing calculation sub-routine at the step (007) of FIG. 18, and when the contrast is high, at step (310), calculation of the equations (8) and (9) is effected on the basis of the data of the memories DF1, DF2, DF3, DL1, DL2, TM1, TM2 and TM3, whereby coefficients a and b corresponding to $a_n$ and $b_n$ of the equations (8) and (9) are found and at step (311), the foreseen lens driving amount based on the equation (10) is found. Consequently, when the contrast is high, lens driving based on the foreseeing calculation equation using a quadratic function is effected. Also, when the contrast is low, steps (308) and (309) are executed and therefore, a foreseen amount based on a linear function by the equations (23) and (24) is found on the basis of the data of each said memory and lens driving is effected.

The past data are required for the foreseeing calculation and therefore, it is necessary to provide, as in the flow shown in FIG. 10, the step of detecting the frequency of focus detection in the foreseeing calculation flow so that the first and second focus detecting operations and lens drivings are such that lens driving conforming to the defocus amount at each time is effected and the control by said foreseeing calculation process is effected from the third and, subsequent focus detecting operations, and it is determined thereby whether said foreseeing calculation process should be effected, but this has no direct relation with the present invention and therefore need not be described.

In the embodiment described hitherto, the design is such that two equations are changed over by the amount of contrast, and a description will hereinafter be given of an embodiment in which the mean value of the results of two equations is found from the amount of contrast.

Figure 21:
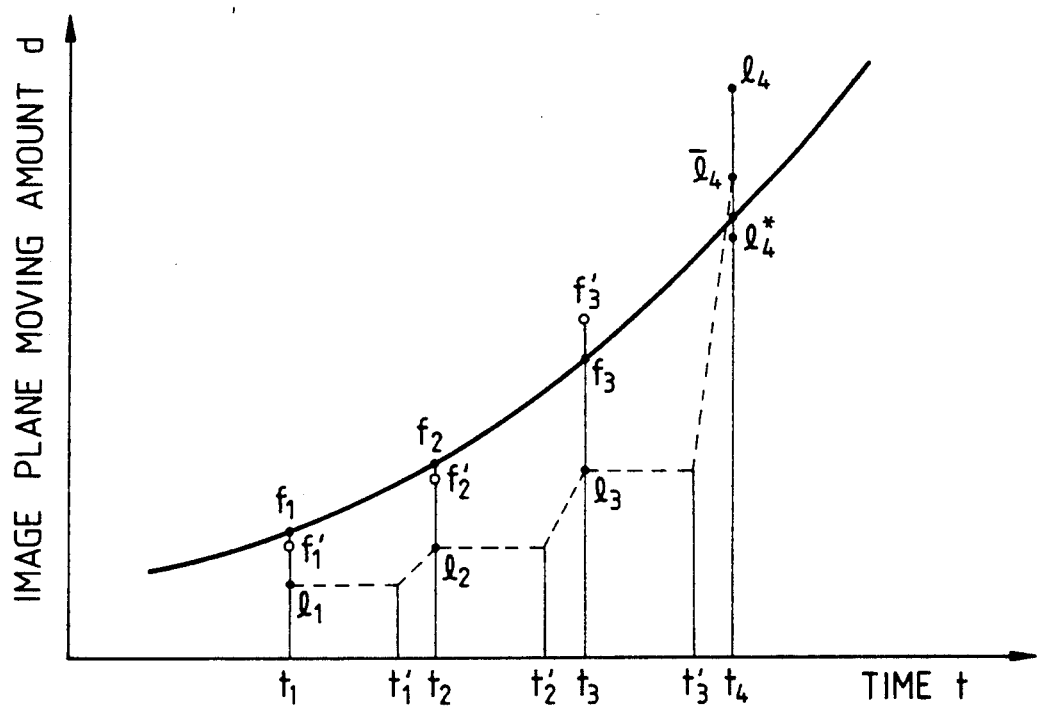
FIG. 21 illustrates the lens driving operation by another foreseeing calculation operation of the present invention.

FIG. 21 shows the mean value $\bar{l}_4$ of the result $l_4$ when a quadratic function is used under the same conditions as FIG. 17 and the result $l_4^*$ when minimum square approximation is used.

The driving amount conforming to said value $\bar{l}_4$ can be found in the following manner. First, the amount of contrast ZD found in the latest focus detecting operation is divided by a predetermined value ZD1, and when the quotient thereof exceeds 1, P is set to 1, and when said quotient is less than 1, the divided value is set to P as it is. By such processing, it is made possible that P becomes approximate to 1 when the contrast is high and that P becomes approximate to 0 when the contrast is low.

On the other hand, assuming that the lens driving amount using the quadratic function represented by the equation (10) is DLS1 and the lens driving amount by the minimum square approximation represented by the equation (24) is DLS2, the lens driving amount DLS which is $$DLS = DLS1 \cdot P + DLS2 \cdot (1-P) \qquad (25)$$

becomes approximate to DLS1 when the contrast is high, and becomes approximate to DLS2 when the contrast is low.

If this is done, weight is automatically applied to the result of the suitable calculation equation by the contrast of the object, and the lens driving by said $\bar{l}_4$ becomes possible.

Figure 22:
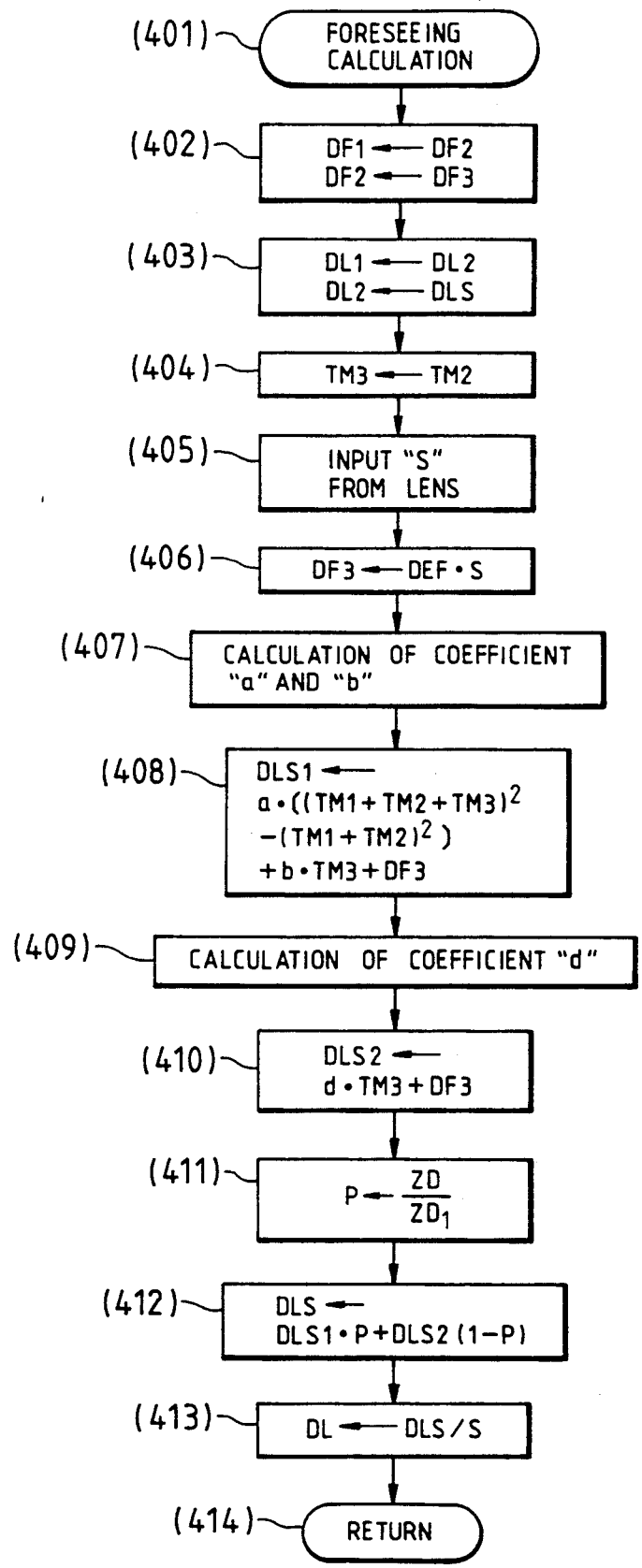
FIG. 22 is a program flow chart for effecting the foreseeing calculation of FIG. 21.

FIG. 22 shows the flow chart of the foreseeing calculation sub-routine for effecting the lens driving of the above-described embodiment. In this flow, steps (401) to (406) are the same as FIG. 20 and therefore need not be described.

At steps (407) and (408), as at the steps (310) and (311) of FIG. 20, the calculation of the quadratic functional equation by the equations (8), (9) and (10) is effected, and at steps (409) and (410), as at the steps (308) and (309) of FIG. 20, the calculation using the minimum square approximation equation using the equations (23) and (24) is effected.

Then, at step (411), the aforedescribed weight coefficient P based on the contrast is found, and at step (412), the weighted calculation of the results of the two calculations by the equation (25) is effected, whereby the final lens driving amount DLS can be obtained.

As another control flow of the lens driving based on this foreseeing calculation sub-routine, use may be made of FIGS. 18 and 19 and therefore, such flow need not be described.

In the minimum square approximation equation described hitherto, a description has been given of an example of the linear function which passes through the point $f_1'$ and in which the error is smallest at the points $f_2'$ and $f_3'$, but of course, use may be made of a linear function in which the error is smallest at the points $f_1'$, $f_2'$ and $f_3'$.

In such case, the calculation equation becomes somewhat complex, but this can be said to be a better method in the sense that the error is minimized.

Also, in the aforedescribed embodiment, an ordinary linear function can also be used instead of the minimum square approximation. In such case, the linear function is inferior to the minimum square approximation in respect of the accuracy of foreseeing, but the calculation equation is greatly simplified and correspondingly, the calculation speed becomes higher and it becomes possible to improve the response speed.

The linear functional equation in such case can be found in the following manner: assuming that a linear function $$d' \cdot t + DF3 = f(t) \tag{26}$$

passes through a point $f_2'(-TM2, DF2-DL2)$, the coefficient $d'$ is found as follows:

$$d' = \frac{DF3 + DL2 - DF2}{TM2} \tag{27}$$

Accordingly, the lens driving amount DLS2' based on said linear function is $$DLS2' = d' \cdot TM3 + DF3. \tag{28}$$

A method of finding the final lens driving amount DLS from said DLS2' and the lens driving amount DLS1 based on a quadratic function is entirely similar to that provided by the flow chart of FIG. 22. That is, by calculating the equations (27) and (28) at the steps (409) and (410) of FIG. 22, lens driving using the weighted calculation of the ordinary linear function and the quadratic function can be accomplished.

We claim:

1. A focus adjusting device for finding the lens driving amount or the position of the image plane for making a lens in-focus to an object after a predetermined time on the basis of data concerned with focus adjustment obtained by the focus adjusting operation in the past, and adjusting the focus to the object after said predetermined time, comprising:

a calculation circuit for finding said lens driving amount or said position of the image plane for making the lens in-focus to the object after said predetermined time, in accordance with a predetermined functional equation by the use of said data obtained by said focus adjusting operation in the past, said calculation circuit having a plurality of equations as said functional equation; and a change-over circuit for changing over said functional equation between a high-order functional equation and a low-order functional equation in conformity with the number of times over which said focus adjusting operation in the past was executed.

2. A focus adjusting device according to claim 1, wherein said changeover circuit selects said low-order functional equation when the number of operation times of said focus adjusting operation is less than a predetermined number, and selects said high-order functional equation when said number exceeds the predetermined number.

3. A focus adjusting device according to claim 2, wherein said high-order functional equation is represented by an equation of $at^2 + bt + c$ in which the coefficients a and b are determined based on the data obtained in the focus adjusting operation performed in the past.

4. A focus adjusting device according to claim 1, wherein said high-order functional equation is represented by an equation $at^2 + bt + c$ in which the coefficients a and b are determined based on data obtained in the focus adjusting operation performed in the past.

5. A focus adjusting device for finding a lens driving amount or a position of an imaging plane for making a lens in-focus to an object after a predetermined time on the basis of data concerned with focus adjustment obtained by the focus adjusting operation in the past, and adjusting the focus to the object after said predetermined time, comprising:

a calculation circuit for finding said lens driving amount or said position of the image plane for making the lens in-focus to the object after said predetermined time, in accordance with a predetermined functional equation by the use of said data obtained by said focus adjusting operation in the past, said calculation circuit having a plurality of equations as said functional equation; and a selecting circuit for selecting said functional equations in conformity with the number of times over which said focus adjusting operation in the past was executed.

6. An automatic focus adjusting device which is provided with a focus detecting circuit for detecting the focus state of an imaging optical system and outputting a focus signal, and a driving circuit for driving said imaging optical system on the basis of the focus signal detected by said focus detecting circuit and which repetitively performs a focus detecting operation cycle including said focus state detecting operation and/or the driving operation of said imaging optical system, including:

(a) a calculation circuit for calculating, in conformity with focus adjustment data obtained in the focus detecting operation cycle in the past, and in accordance with a foreseeing calculation equation, the lens driving amount or the position of the image plane taking into consideration the amount of out-of-focus resulting from the movement of an object during a predetermined time from a point of time at which the latest focus detecting operation has been performed; and (b) a correction circuit for making said foreseeing calculation equation different in conformity with the number of focus adjustment data obtained in the focus detecting operation cycle in the past used in said calculation equation.

7. An automatic focus adjusting device according to claim 6, wherein said correction circuit makes said foreseeing calculation equation different in conformity with the number of the focus detecting operation cycles executed in the past.

8. An automatic focus adjusting device according to claim 7, wherein said correction circuit effects said foreseeing calculation equation using a first equation from the time after the first focus detecting operation cycle is executed until said cycle is executed a predetermined number of times, and thereafter effects said foreseeing calculation equation using a second equation.

9. An automatic focus adjusting device according to claim 8, wherein said first equation is a low-order functional equation relative to said second equation.

10. A focus adjusting device according to claim 9, wherein said second equation is represented by $at+bt+c$ in which the coefficient a and b are determined based on the data obtained in the focus adjusting operation performed in the past.

11. An automatic focus adjusting device which is provided with a focus detecting circuit for detecting the focus state of an imaging optical system and outputting a focus signal, and a driving circuit for driving said imaging optical system on the basis of the focus signal detected by said focus detecting circuit and which repetitively performs a focus detecting operation cycle including said focus state detecting operation and/or the driving operation of said imaging optical system, including:

(a) a calculation circuit for calculating, in accordance with a foreseeing calculation equation, the lens driving amount or the position of the image plane taking into consideration the amount of out-of-focus resulting from the movement of an object during a predetermined time from a point of time at which the latest focus detecting operation has been performed and in conformity with focus adjustment data obtained in the focus detecting operation cycle in the past;

(b) a detecting circuit for detecting the number of times of the execution of said focus detecting operation cycle;

(c) a release operating member; and (d) a release operation control circuit for starting the release operation responsive to the operation of said release operating member after the completion of the driving of the imaging optical system when the number of times of the execution of the focus detecting operation cycle detected by said detecting circuit does not reach a predetermined number, and immediately effecting the release operation by the operation of the release operating member when said number of times of the execution reaches the predetermined number.

12. A focus adjusting device according to claim 11, wherein said foreseeing calculation equation includes first and second different equations which independently perform the foreseeing calculation, the calculation being made by the first equation until the number of operation times of the focus detecting cycle reaches a predetermined number and by the second equation after the number exceeds the predetermined number.

13. A focus adjusting device according to claim 12, wherein said first equation is a low-order functional equation and said second equation is a high-order functional equation.

14. A focus adjusting device according to claim 13, wherein said second equation is represented by $at^2+bt+c$ in which the coefficients a and b are determined based on the data obtained in the focus adjusting operation performed in the past.

15. An automatic focus adjusting device for driving a lens on the basis of an output of a focus detecting circuit, comprising:

a calculation circuit for processing, by a predetermined functional equation, past focus adjustment data obtained by said focus adjusting device in the focus adjusting operation including the focus detecting operation in the past by said focus detecting circuit, and finding the lens driving amount or the position of the image plane taking the movement of an object into consideration;

a driving circuit for driving a lens in conformity with said calculation output; and a correction circuit for making the calculation by said calculation different in conformity with the reliability of the focus output from the focus detecting circuit, the reliability of said focus signal being judged on the basis of the highness and lowness of contrast.

16. An automatic focus adjusting device for driving a lens on the basis of an output of a focus detecting circuit comprising:

a calculation circuit for processing by a predetermined functional equation, past focus adjustment data obtained by said focus adjusting device in the focus adjusting operation including the focus detecting operation in the past by said focus detecting circuit, and finding the lens driving amount for the position of the image plane taking the movement of an object into consideration, said calculation circuit having a plurality of calculation equations including a first equation and a second equation;

a driving circuit for driving a lens in conformity with said calculation output; and a correction circuit for selecting a predetermined equation in conformity with the reliability of a focus output from said focus detecting circuit, the reliability of said focus signal output being judged on the basis of the highness and lowness of contrast.

17. An automatic focus adjusting device according to claim 16, wherein said first equation and said second equation are calculation equations differing in order from each other.

18. A focus adjusting device according to claim 17, wherein said first equation is a low-order functional equation and said second equation is a high-order functional equation.

19. A focus adjusting device according to claim 18, wherein said correction circuit selects the high-order functional equation when contrast is high and selects the low-order functional equation when the contrast is low.

20. A focus adjusting device according to claim 18, wherein said second equation is represented by $at^2+bt+c$ in which the coefficients a and b are determined based on the data obtained in the focus adjusting apparatus performed in the past.

21. An automatic focus adjusting device for driving a lens on the basis of the output of a focus detecting circuit, including:
   (a) a calculation circuit for processing, by a predetermined functional equation, past focus adjustment data obtained in a focus adjusting operation effected in the past by said focus adjusting device including a focus detecting operation performed by said focus detecting circuit, and for finding the lens driving amount or the position of the image plane taking the movement of an object into consideration, said calculation circuit being provided with a plurality of equations including a first equation and a second equation as said functional equation, said first and second equations being calculation equations different in order from each other, said first and second equations independently determining the lens driving amount or the image plane position to make the object in-focus after a predetermined time with the movement of the object taken into consideration; and
   (b) a selecting circuit for selecting said plurality of equations.

22. An automatic focus adjusting device according to claim 21, wherein said focus adjustment data includes a focus signal obtained in the focus detecting operation.

23. An automatic focus adjusting device for driving a lens on the basis of the output of a focus detecting circuit, including:
   a calculation circuit including a first functional equation for processing past focus adjustment data obtained in the focus adjusting operation effected in the past by said focus adjusting device including a focus detecting operation performed by said focus detecting circuit, and a second functional equation for processing said data independently of said first functional equation, said first and second functional equations of said calculation circuit calculating the lens driving amount or the position of the image plane taking the movement of an object into consideration, independently of each other, said calculation circuit finding the lens driving amount or the position of the image plane taking the movement of the object into consideration on the basis of both calculated values obtained by said first and second functional equations.

24. An automatic focus adjusting device according to claim 23, wherein said first functional equation and said second functional equation are functional equations differing in order from each other.

25. An automatic focus adjusting device according to claim 24, wherein said calculation circuit effects weighting on said calculated values with a signal obtained in the focus detecting operation as a factor.

26. An automatic focus adjusting device according to claim 25, wherein the signal obtained in said focus detecting operation is a signal representative of contrast.

27. An automatic focus adjusting device according to claim 23, wherein said focus adjustment data includes a focus signal obtained in the focus detecting operation.

28. A camera having an auto-focus adjusting device which is provided with a focus detecting circuit and a driving circuit, and which repeatedly perform focus state detecting operations by said focus detecting circuit and/or driving operations of an imaging optical system, including:
   (a) a calculation circuit for calculating a driving amount or a position of the image plane for making the imaging optical system in-focus to the object after a predetermined time on the basis of data concerned in focus adjusting obtained by past focus detecting operation cycles;
   (b) a drive circuit for driving the imaging optical system on the basis of an output of the calculation circuit;
   (c) a detecting circuit for detecting the number of times of the execution of the focus detecting operation cycle;
   (d) a release operating member; and
   (e) a release operation control circuit for starting a release operation responsive to the operation of said release operating member after the completion of the driving of the imaging optical system when the number of times of the execution of the focus detecting operation cycle detected by said detecting circuit does not reach a predetermined number, and immediately effecting the release operation by the operation of the release operating member when said number of times of the execution reaches the predetermined number.

29. A camera according to claim 28, wherein said calculation circuit executes the calculation based on first and second different equations, said equations independently obtaining the driving amount or the position of the image plane, the calculation being performed by said first equation when the number of times of the execution of the focus detecting operation does not reach the predetermined number and by said second equation after the number reaches the predetermined number.

30. A camera according to claim 29, wherein said first equation is a low-order functional equation and said second equation is a high-order functional equation.

31. A camera according to claim 30, wherein said second equation is represented by $at^2+bt+c$ in which the coefficients a and b are determined based on the data obtained in the focus adjusting operation performed in the past.

32. A camera having a focus adjusting device for finding a lens driving amount or a position of an image plane for making a lens in-focus to an object after a predetermined time on the basis of data concerned with focus adjustment obtained by a focus adjusting operation in the past, and adjusting the focus to the object after said predetermined time, comprising:
   a calculation circuit for finding said lens driving amount or said position of the image plane for making the lens in-focus to the object after a predetermined time, in accordance with a predetermined functional equation by the use of said data obtained by said focus adjusting operation in the past, said calculation circuit having a plurality of equations as said functional equation; and
   a change-over circuit for changing over said functional equation between a high-order functional equation and a low-order functional equation in conformity with the number of times over which said focus adjusting operation in the past was executed.

33. A focus adjusting device according to claim 32, wherein said second equation is represented by $at^2+bt+c$ in which the coefficients a and b are determined based on the data obtained in the focus adjusting operation performed in the past.

34. A focus adjusting device according to claim 32, wherein said changeover circuit selects said low-order functional equation when the number of operation times of said focus adjusting operation is less than a predetermined number and selects said high-order functional equation after the number exceeds the predetermined number.

35. A focus adjusting device according to claim 34, wherein said high-order function is represented by an equation $at^2+bt+c$ in which the coefficients a and b are determined based on the data obtained in the focus adjusting operation performed in the past.

36. A focus adjusting device according to claim 32, wherein said high-order functional equation is represented by an equation $at^2+bt+c$ in which the coefficients a and b are determined based on the data obtained in the focus adjusting operation performed in the past.

37. A camera having an automatic focus adjusting device for driving a lens on the basis of the output of a focus detecting circuit, comprising:
   (a) a calculation circuit for processing, by a predetermined functional equation, past focus adjustment data obtained by said focus adjusting device in a focus adjusting operation including a focus detecting operation performed in the past by said focus detecting circuit, and for finding the lens driving amount or the position of the image plane taking the movement of an object into consideration;
   (b) a driving circuit for driving a lens in conformity with said calculation output; and
   (c) a correction circuit for making the functional equation used by said calculation circuit different in conformity with a reliability of a focus signal obtained by said focus detecting circuit, said reliability of focus output being judged on the basis of the highness or lowness of contrast.

38. A camera according to claim 37, wherein said functional equation includes a low-order functional equation and a high-order functional equation, the lens driving amount or the position of the image plane being obtained by said low-order equation when contrast is low and by said high-order equation when the contrast is high.

39. A camera according to claim 38, wherein said high-order equation is represented by $at^2+bt+c$ in which the coefficients a and b are determined based on the data obtained in the focus adjusting operation performed in the past.

40. An automatic focus adjusting device for driving a lens on the basis of the output of a focus detecting circuit, including:
   (a) a calculation circuit for processing, by a predetermined functional equation, past focus adjustment data obtained in a focus adjusting operation effected in the past by said focus adjusting device including a focus detecting operation performed by said focus detecting circuit, and for finding the lens driving amount or the position of the image plane taking the movement of an object into consideration, said calculation circuit being provided with a plurality of functional equations including a first equation and a second equation, said first equation and said second equation being calculation equations differing in order from each other, said first and second equations independently determining the lens driving amount or the image plane position to make the object in-focus after a predetermined time with the movement of the object taken into consideration; and
   (b) a selecting circuit for selecting among said plurality of equations.

41. A camera having an automatic focus adjusting device for driving a lens on the basis of the output of a focus detecting circuit, including:
   a calculation circuit including a first functional equation for processing past focus adjustment data obtained in a focus adjusting operation effected in the past by said focus adjusting device including a focus detecting operation performed by said focus detecting circuit, and a second functional equation for processing said data independently of said first functional equation, said first and second functional equations of said calculation circuit calculating the lens driving amount or the position of the image plane taking the movement of an object into consideration, independently of each other, said calculation circuit finding the lens driving amount or the position of the image plane taking the movement of the object into consideration on the basis of both calculated values obtained by said first and second functional equations.

* * * * *

UNITED STATES PATENT AND TRADEMARK OFFICE
CERTIFICATE OF CORRECTION

PATENT NO. : 5,060,002
DATED : October 22, 1991
INVENTOR(S) : Ichiro Ohnuki, et al.

It is certified that error appears in the above-identified patent and that said Letters Patent is hereby corrected as shown below:

COLUMN 2:

line 15, "$t_1 0, t_2 = TM1, t_3 = TM1+TM2$ (4)" should read
--$t_1=0, t_2=TM1, t_3=TM1+TM2$ (4)--; and line 57, "(8)" should read --(8')--.

COLUMN 3:

line 59, "$f_{r1}-1'_{r1}=d'_{x2}$" should read --$f_{r1}-1'_{r1}=d'_{x1}$--.

COLUMN 4:

line 1, "less an" should read --less of an--; and
line 19, "and" (first occurrence) should read --are--.

COLUMN 5:

line 47, "accomplished" should read --accomplish--;
line 48, "aspect:" should read --aspect--; and
line 50 "to said" should read --to select said--.

COLUMN 6:

line 61, "equation (15);" should read --equation (15)--.

COLUMN 8:

line 49, "be" (second occurrence) should be deleted.

UNITED STATES PATENT AND TRADEMARK OFFICE
CERTIFICATE OF CORRECTION

PATENT NO. : 5,062,002
DATED : October 22, 1991
INVENTOR(S) : Ichiro Ohnuki, et al.

It is certified that error appears in the above-identified patent and that said Letters Patent is hereby corrected as shown below:

COLUMN 9:

line 56, "flow" should read --flow-- (both occurrences).

COLUMN 11:

line 5, "flow" should read --flow--;
    line 11, "flow" should read --flow--;
    line 14, "flow" should read --flow--; and
    line 19, "flow" should read --flow--.

COLUMN 13:

line 2, "sion/" should read --sion--.

COLUMN 14:

line 5, "This a" should read --This is a--;
    line 35, "an," should read --$a_n$,--; and
    line 39, "step use" should read --step, use--.

COLUMN 15:

line 18, "sub-routine" should read --sub-routine.--;
    line 33, "movement" should read --mirror-up movement--;
    line 61, "in the first focus detecting opera-" should be deleted; and
    line 62, line 62 should be deleted;

UNITED STATES PATENT AND TRADEMARK OFFICE
CERTIFICATE OF CORRECTION

PATENT NO. : 5,060,002

DATED : October 22, 1991

INVENTOR(S) : Ichiro Ohnuki, et al.

It is certified that error appears in the above-identified patent and that said Letters Patent is hereby corrected as shown below:

COLUMN 16:

line 2, "(15)" should read --(15))--;
    line 7, "f1ow" should read --flow--;
    line 15, "(005)-(011)," should read --(005)-(011)--;
    line 23, "come in" should read --closed--; and
    line 52, "$f_1'$, $f_2'$, $f_3'$" should read --$f'_1$, $f'_2$, $f'_3$--.

COLUMN 17:

line 62, "f1ow" should read --flow--; and
    line 64, "f1ow" should read --flow--.

COLUMN 18:

line 11, "calculate" should read --calculates--;
    line 18, "f1ow" should read --flow--;
    line 27, "specific," should read --specific--;
    line 34, "f1ow" should read --flow--;
    line 38, "f1ow" should read --flow--;
    line 40, "f1ow" should read --flow-- (both occurrences);
    line 42, "is shift" should read --a shift--; and
    line 54, "made" should read --given--.

COLUMN 21:

line 42, "branche" should read --branches--.

UNITED STATES PATENT AND TRADEMARK OFFICE
CERTIFICATE OF CORRECTION

PATENT NO.   : 5,060,002
DATED        : October 22, 1991
INVENTOR(S)  : Ichiro Ohnuki, et al.

It is certified that error appears in the above-identified patent and that said Letters Patent is hereby corrected as shown below:

COLUMN 22:

line 23, "and," should read --and--; and
    line 55, "DLS=DLS119P+DLS2·(1-P)    (25)" should read
           --DLS=DLS1·P+DLS2·(1-P)    (25)--.

COLUMN 25:

line 25, "at+bt+c" should read --$at^2+bt+c$-- and
           "coefficient a and b" should read
           --coefficients a and b--.

COLUMN 26:

line 26, "calculation" should read --calculation circuit--; and line 32, "circuit" should read --circuit,--.

UNITED STATES PATENT AND TRADEMARK OFFICE
CERTIFICATE OF CORRECTION

PATENT NO. : 5,060,002
DATED : October 22, 1991
INVENTOR(S) : Ichiro Ohnuki, et al.

It is certified that error appears in the above-identified patent and that said Letters Patent is hereby corrected as shown below:

COLUMN 28:

line 65, "second equation" should read --high-order equation--.

COLUMN 29:

line 9, "high-order function" should read --high-order functional equation--.

Signed and Sealed this

Fifteenth Day of June, 1993

Attest:

MICHAEL K. KIRK

Attesting Officer      Acting Commissioner of Patents and Trademarks